United States Patent
Kazan et al.

(10) Patent No.: US 10,893,082 B2
(45) Date of Patent: Jan. 12, 2021

(54) PRESENTING CONTENT ITEMS SHARED WITHIN SOCIAL NETWORKS

(71) Applicant: Microsoft Technology Licensing, LLC, Redmond, WA (US)

(72) Inventors: Wissam Kazan, Redmond, WA (US); Amanda Font, Kirkland, WA (US); Mona Akmal, Bellevue, WA (US); Samuel DeKoven Grossberg, Seattle, WA (US); Francislav P. Penov, Kirkland, WA (US); Benjamin Nicholas Truelove, Lynnwood, WA (US); Vasudha Chandrasekaran, Kirkland, WA (US); Shazaan Bahrainwala, Seattle, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 1043 days.

(21) Appl. No.: 14/874,739

(22) Filed: Oct. 5, 2015

(65) Prior Publication Data
US 2016/0028782 A1    Jan. 28, 2016

Related U.S. Application Data

(63) Continuation of application No. 12/966,557, filed on Dec. 13, 2010, now Pat. No. 9,153,000.

(51) Int. Cl.
| | |
|---|---|
| *G06F 3/00* | (2006.01) |
| *H04L 29/06* | (2006.01) |
| *G06F 3/048* | (2013.01) |
| *G06F 16/9535* | (2019.01) |
| *G06Q 10/10* | (2012.01) |

(Continued)

(52) U.S. Cl.
CPC ............ *H04L 65/403* (2013.01); *G06F 3/048* (2013.01); *G06F 3/0484* (2013.01);
(Continued)

(58) Field of Classification Search
CPC ...... G06F 3/048; G06F 3/0481; G06F 3/0483; G06F 16/9535; G06F 3/0484;
(Continued)

(56) References Cited

U.S. PATENT DOCUMENTS

| | | |
|---|---|---|
| 6,334,127 B1 | 12/2001 | Bieganski et al. |
| 7,548,932 B2 | 6/2009 | Horvitz et al. |

(Continued)

FOREIGN PATENT DOCUMENTS

WO    2010031413 A1    3/2010

OTHER PUBLICATIONS

"Comments Bar", Retrieved from <<http://web.archive.org/web/20100820151505/http://www.commentsbar.com/>>, Retrieved Date: Aug. 16, 2010, 2 Pages.

(Continued)

*Primary Examiner* — Kieu D Vu
*Assistant Examiner* — Andrew Chung
(74) *Attorney, Agent, or Firm* — Liang IP, PLLC

(57) ABSTRACT

Within a social network, a user may establish a set of contacts who share with the user various content items and comments related thereto. However, these content items are often hosted by a content source outside of the social network, and the user may have to transition to the content source to view the content item, and then transition back to the social network to submit a comment. Instead, a device may monitor the social network to record shared content items. When the user requests a presentation of the content source, the content items hosted by the content source that have been shared with the user may be included in the (Continued)

presentation. The presentation of the content source may also accept comments from the user regarding a content item, and send the comments to the social network where the content item was shared with the user.

20 Claims, 11 Drawing Sheets

(51) Int. Cl.
  *G06Q 50/00* (2012.01)
  *G06F 3/0484* (2013.01)
  *H04L 29/08* (2006.01)
(52) U.S. Cl.
  CPC ....... *G06F 16/9535* (2019.01); *G06Q 10/101* (2013.01); *G06Q 50/01* (2013.01); *H04L 67/02* (2013.01)
(58) Field of Classification Search
  CPC ..... H04L 65/403; H04L 67/02; G06Q 10/101; G06Q 50/01
  See application file for complete search history.

(56) References Cited

U.S. PATENT DOCUMENTS

| | | | |
|---|---|---|---|
| 7,647,332 B2 | 1/2010 | Van Flandern et al. | |
| 7,730,216 B1* | 6/2010 | Issa | H04L 67/104 709/214 |
| 7,814,089 B1* | 10/2010 | Skrenta | G06F 17/30864 707/709 |
| 7,970,827 B1 | 6/2011 | Cumberbatch et al. | |
| 8,032,511 B1* | 10/2011 | Skrenta | G06F 17/30864 707/709 |
| 8,046,237 B1* | 10/2011 | King | G06Q 30/02 705/26.1 |
| 8,255,812 B1* | 8/2012 | Parparita | G06F 17/30867 715/762 |
| 8,285,810 B2 | 10/2012 | Svendsen et al. | |
| 2003/0097410 A1 | 5/2003 | Atkins et al. | |
| 2004/0059783 A1* | 3/2004 | Kazui | G06F 17/30817 709/205 |
| 2005/0033657 A1* | 2/2005 | Herrington | G06F 17/30058 705/26.7 |
| 2005/0091595 A1 | 4/2005 | Shappell et al. | |
| 2005/0216550 A1* | 9/2005 | Paseman | G06Q 10/00 709/202 |
| 2006/0294192 A1 | 12/2006 | Mao et al. | |
| 2007/0162442 A1* | 7/2007 | Brill | G06F 17/3064 |
| 2007/0282887 A1* | 12/2007 | Fischer | G06F 17/30867 |
| 2008/0182563 A1* | 7/2008 | Wugofski | G06Q 10/10 455/414.2 |
| 2008/0189617 A1* | 8/2008 | Covell | G06F 17/3089 715/738 |
| 2008/0235592 A1 | 9/2008 | Trauth | |
| 2008/0255889 A1* | 10/2008 | Geisler | G06Q 10/02 705/5 |
| 2009/0019375 A1* | 1/2009 | Garofalo | G06Q 10/06398 715/753 |
| 2009/0019395 A1* | 1/2009 | Radom | G06F 3/0237 715/816 |
| 2009/0043814 A1* | 2/2009 | Faris | G06F 17/30038 |
| 2009/0144392 A1* | 6/2009 | Wang | G06Q 10/10 709/217 |
| 2009/0157312 A1 | 6/2009 | Black et al. | |
| 2009/0158176 A1* | 6/2009 | Kalaboukis | G06F 17/3089 715/758 |
| 2009/0193032 A1* | 7/2009 | Pyper | G06Q 30/02 |
| 2009/0222750 A1* | 9/2009 | Jain | G06Q 10/00 715/767 |
| 2009/0248516 A1 | 10/2009 | Gross | |
| 2009/0249244 A1* | 10/2009 | Robinson | G06F 3/0481 715/781 |
| 2009/0327282 A1* | 12/2009 | Wittig | G06F 16/176 |
| 2010/0017714 A1* | 1/2010 | Agarwal | G06Q 10/00 715/716 |
| 2010/0057682 A1* | 3/2010 | Ramsay, Jr. | G06Q 10/10 707/E17.014 |
| 2010/0070899 A1* | 3/2010 | Hunt | G06F 3/0486 715/769 |
| 2010/0083124 A1* | 4/2010 | Druzgalski | G06F 17/30241 715/738 |
| 2010/0185932 A1 | 7/2010 | Coffman et al. | |
| 2010/0241488 A1* | 9/2010 | Jacobson | G06Q 30/0205 705/7.34 |
| 2010/0241964 A1* | 9/2010 | Belinsky | G06F 17/3089 715/738 |
| 2010/0241968 A1 | 9/2010 | Tarara et al. | |
| 2010/0251094 A1 | 9/2010 | Holm et al. | |
| 2010/0287033 A1 | 11/2010 | Mathur | |
| 2010/0287592 A1 | 11/2010 | Patten et al. | |
| 2011/0004831 A1* | 1/2011 | Steinberg | H04N 21/454 715/753 |
| 2011/0035673 A1 | 2/2011 | Chou et al. | |
| 2011/0047463 A1* | 2/2011 | Shepherd | G06Q 10/10 715/723 |
| 2011/0077998 A1* | 3/2011 | Yan | G06Q 30/02 705/7.29 |
| 2011/0083101 A1* | 4/2011 | Sharon | H04W 4/21 715/800 |
| 2011/0126253 A1 | 5/2011 | Roberts et al. | |
| 2011/0145219 A1* | 6/2011 | Cierniak | G06F 17/30867 707/709 |
| 2011/0153414 A1 | 6/2011 | Elvekrog et al. | |
| 2011/0161883 A1* | 6/2011 | Kennedy | G06F 3/0482 715/835 |
| 2011/0163969 A1* | 7/2011 | Anzures | G06F 3/04883 345/173 |
| 2011/0167357 A1* | 7/2011 | Benjamin | H04L 12/1818 715/753 |
| 2011/0179288 A1 | 7/2011 | Catrein et al. | |
| 2011/0179378 A1* | 7/2011 | Wheeler | G06F 17/3089 715/780 |
| 2011/0196922 A1* | 8/2011 | Marcucci | H04W 4/21 709/204 |
| 2011/0231478 A1* | 9/2011 | Wheeler | G06F 17/30864 709/203 |
| 2011/0258561 A1* | 10/2011 | Ladouceur | G06Q 10/103 715/753 |
| 2011/0265011 A1 | 10/2011 | Taylor et al. | |
| 2011/0271332 A1* | 11/2011 | Jones | H04L 9/3247 726/7 |
| 2011/0320373 A1* | 12/2011 | Lee | G06Q 50/01 705/319 |
| 2012/0005224 A1 | 1/2012 | Ahrens et al. | |
| 2012/0016948 A1 | 1/2012 | Sinha | |
| 2012/0030587 A1* | 2/2012 | Ketkar | G06F 17/30038 715/751 |
| 2012/0066618 A1* | 3/2012 | Barker | G06F 17/30185 715/753 |
| 2012/0079004 A1* | 3/2012 | Herman | H04L 67/26 709/203 |
| 2012/0102050 A1 | 4/2012 | Button et al. | |
| 2012/0110429 A1* | 5/2012 | Tzonis | G06Q 10/10 715/230 |
| 2012/0110464 A1* | 5/2012 | Chen | H04W 4/21 715/738 |
| 2012/0110621 A1 | 5/2012 | Gossweiler, III | |
| 2012/0110642 A1* | 5/2012 | Grassel | G06Q 10/101 726/4 |
| 2012/0150971 A1 | 6/2012 | Bahrainwala et al. | |
| 2012/0151320 A1 | 6/2012 | McClements, IV | |
| 2012/0151383 A1* | 6/2012 | Kazan | G06Q 10/101 715/753 |
| 2012/0153120 A1* | 6/2012 | Baxter | G01S 17/026 250/205 |

(56) References Cited

U.S. PATENT DOCUMENTS

| | | | | |
|---|---|---|---|---|
| 2013/0035982 | A1* | 2/2013 | Zhang | G06Q 30/02 705/7.29 |
| 2013/0173734 | A1* | 7/2013 | Oteiza Lacalle | G06F 17/30867 709/207 |
| 2014/0052538 | A1* | 2/2014 | Foote | G06Q 30/02 705/14.66 |

OTHER PUBLICATIONS

"Friend Feed Help Center", Retrieved from <<http://web.archive.org/web/20080501153907/http://friendfeed.com/about/help>>, May 1, 2008, 15 Pages.

"Google Buzz", Retrieved from <<http://web.archive.org/web/20100818031651/http://www.google.com/buzz>>, Aug. 16, 2010, 1 Page.

"Google Reader", Retrieved from <<http://web.archive.org/web/20091029140348/http://www.google.com/support/reader/bin/answer.py?hl=en&answer=142213>>, Oct. 29, 2009, 2 Pages.

"Final Office Action Issued in U.S. Appl. No. 12/966,557", dated Mar. 29, 2013, 25 Pages.

"Final Office Action Issued in U.S. Appl. No. 12/966,557", dated Mar. 26, 2014, 28 Pages.

"Non-Final Office Action Issued in U.S. Appl. No. 12/966,557", dated Sep. 18, 2014, 26 Pages.

"Non-Final Office Action Issued in U.S. Appl. No. 12/966,557", dated Nov. 22, 2013, 26 Pages.

"Non-Final Office Action Issued in U.S. Appl. No. 12/966,557", dated Oct. 1, 2012, 21 Pages.

Gray, Louis, "Browzmi Lets You Share Browsing Experience With Friends", Retrieved from <<http://blog.louisgray.com/2008/06/browzmi-lets-you-share-browsing.html>>, Jun. 28, 2008, 3 Pages.

"Notice of Allowance Issued in U.S. Appl. No. 12/966,557", dated May 22, 2015, 15 Pages.

"Final Office Action Issued in U.S. Appl. No. 12/966,597", dated Nov. 5, 2015, 24 Pages.

"Final Office Action Issued in U.S. Appl. No. 12/966,597", dated Aug. 7, 2013, 35 Pages.

"Final Office Action Issued in U.S. Appl. No. 12/966,597", dated Jun. 2, 2017, 26 Pages.

"Non Final Office Action Issued in U.S. Appl. No. 12/966,597", dated Mar. 26, 2014, 34 Pages.

"Non Final Office Action Issued in U.S. Appl. No. 12/966,597", dated Jan. 29, 2015, 22 Pages.

"Non Final Office Action Issued in U.S. Appl. No. 12/966,597", dated Sep. 22, 2016, 23 Pages.

Andre, et al., "Discovery Is Never by Chance: Designing for (Un)Serendipity", In Proceedings of the Seventh ACM Conference on Creativity and Cognition, Oct. 26, 2009, 10 Pages.

Beale, Russell, "Supporting Serendipity: Using Ambient Intelligence to Augment User Exploration for Data Mining and Web Browsing", In International Journal of Human-Computer Studies, vol. 65, Issue 5, May 2007, 26 Pages.

Bellotti, et al., "Activity-Based Serendipitous Recommendations with the Magitti Mobile Leisure Guide", In Proceedings of the SIGCHI Conference on Human Factors in Computing Systems, Apr. 5, 2008, pp. 1157-1166.

Campos, et al., "Searching the Unsearchable: Inducing Serendipitous Insights", In Proceedings of the Workshop Program at the Fourth International Conference on Case-based Reasoning, Apr. 1, 2003, 6 Pages.

Hilliges, Otmar, "Finding the Unknown—Serendipitous Discovery in Co-Located Consumption of Digital Photo Collections", In Workshop Collocated Social Practices Surrounding Photos in Conjunction with the SIGCHI Conference on Human Factors in Computing Systems , Apr. 24, 2008, 3 Pages.

Iaquinta, et al., "Introducing Serendipity in a Content-based Recommender System", In Proceedings of Eighth International Conference on Hybrid Intelligent Systems, Sep. 10, 2008, pp. 168-173.

Mathes, Adam, "Folksonomies—Cooperative Classification and Communication Through Shared Metadata", Retrieved from: http://www.adammathes.com/academic/computer-mediated-communication/folksonomies.html, Dec. 30, 2004, 19 Pages.

* cited by examiner

PRESENTING CONTENT ITEMS SHARED WITHIN SOCIAL NETWORKS

CROSS-REFERENCE TO RELATED CASES

The present application is a continuation of and claims priority to U.S. patent application Ser. No. 12/966,557, filed on Dec. 13, 2010 and also entitled "Presenting Content Items Shared Within Social Networks," the entirety of which is hereby incorporated by reference as if fully rewritten herein.

BACKGROUND

Within the field of computing, many scenarios involve a social network, such as a database of users and associations established thereamong to represent various types of relationships (e.g., familial relations, friendships, and academic, professional, and business relationships). A user within a social network may establish a set of contacts, such as individuals with whom the user has a relationship, and may add new individuals as new relationships are formed. The social network may enable users to share with his or her contacts within the social network various types of messages, such as personal status messages. The social network may also allow a user to view the messages shared with the user by his or her contacts, such as a news feed comprising the personal status messages of the user's contacts.

Within a social network, a user may share with his or her contacts one or more content items hosted by various content sources. Such content items and content sources may include, e.g., web pages hosted by a website, images hosted by an image database, audio or video recordings hosted by an audio or video sharing service, and files hosted by a file server. A user may share these content items with his or her contacts in many ways, e.g., by adding an item to a set of shared content items that are of interest to the user and that may be viewable by all contacts of the user, or by sending a message to a contact that references a content item. The user may also annotate the content item with a comment, such as a summary of the content item or the user's personal opinions of the content item, and his or her contacts may also be permitted to annotate the content item with comments. The social network may promote this sharing of content items by generating a presentation thereof; e.g., upon request of a user, the social network may generate a content item feed comprising the content items that have been shared with the user by his or her contacts. For a particular content item hosted by a content source (e.g., an image hosted by an image database), the social network may be configured to integrate the content item with the presentation, or to provide a reference to the content item hosted by the content source (e.g., a preview version of an image hosted by the image database, and a hyperlink to an area of the image database where a full version of the image may be viewed). The content source may also permit users to submit comments regarding a content item.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

A user of a social network may find that many contacts are sharing content items with the user. For example, the content items shared with the user of a social network may include content items sent by contacts of the user in private messages; content items that are posted by a contact on a public message portion of the social profile of the user; content items posted on a public message portion of the social profile of a contact; and references to content items that are included in personal status messages of a contact. For some of these content items, the user may have to view the content item outside of the social network, e.g., by visiting the content source and requesting the content item. The contacts of the user may also post comments regarding the content item, but these, also, may only be viewable by the user upon visiting the content source. However, if many content items hosted my different content sources are shared with a user, the user may have to visit many content sources in order to view the content items. Additionally, after viewing the content item at the content source, the user may wish to submit a comment regarding the content item. However, if the user is viewing the content item at the content source, the user may have the options of submitting a comment to be added to the content item at the content source (which other users may have to visit in order to view the comment of the user), and of returning to the social network and submitting a comment there (e.g., by navigating back to the area of the social network where the contact of the user shared the content item, and by adding a comment to that area of the social network). However, the comments of the user stored by the content source are not frequently combined with the comments of the user stored by the social network, resulting in a disjointed user experience. For example, for a particular content item shared with the user by a contact, some comments may be stored by and may appear within the social network (e.g., in a news feed including the content item), while other comments may be stored by and may appear in the content source (e.g., in the presentation of the content item viewed at the content source). This scenario may become even more disjointed if the user belongs to several social networks, such that content items may be shared with the user by contacts from several social networks, resulting in an undesirable distribution of shared content items and comments relating thereto across several social networks and many content sources.

Presented herein are techniques for aggregating content items hosted by content sources and shared with a user within one or more social networks. In accordance with these techniques, a device may be configured to retrieve content items shared with the user within the social network(s). When the user visits a content source (such as a website, an image database, an audio or video sharing service, or a file server), the device may retrieve the content items that are hosted by the content source and that have been shared with the user by a contact within a social network. The content items so retrieved may be included in a presentation of the content source to the user. The device may also permit the user to submit a comment to a content item, and may send the comment back to the social network where the content item was shared.

As an exemplary application of these techniques, if a user visits an image database, a device may identify the set of images that are hosted by the image database and that one or more contacts of the user within the social network have shared with the user. For example, the device may retrieve the actual content item, a preview version of the content item (e.g., a title of a post or a thumbnail of an image), and/or a reference to the content item (e.g., a hyperlink to the content item hosted at the content source), as well as any comments submitted by the contacts of the user regarding the content item, where such comments are posted either within the social network or at the content source. The device may then supplement the presentation of the image database with a list of content items hosted by the image database that have been shared with the user by a contact within the social network, including any comments posted about the content items within either the social network or the content source. Moreover, if the user submits a comment regarding an image, instead of (or in addition to) submitting the comment to the content source for association with the content item, the device may send the comment to the social network, which may associate the comment with the instance of the sharing of the content item. In this manner, these techniques may improve the integration of content sources with one or more social networks by reducing the distracting transitions of the user between content sources and the social network.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
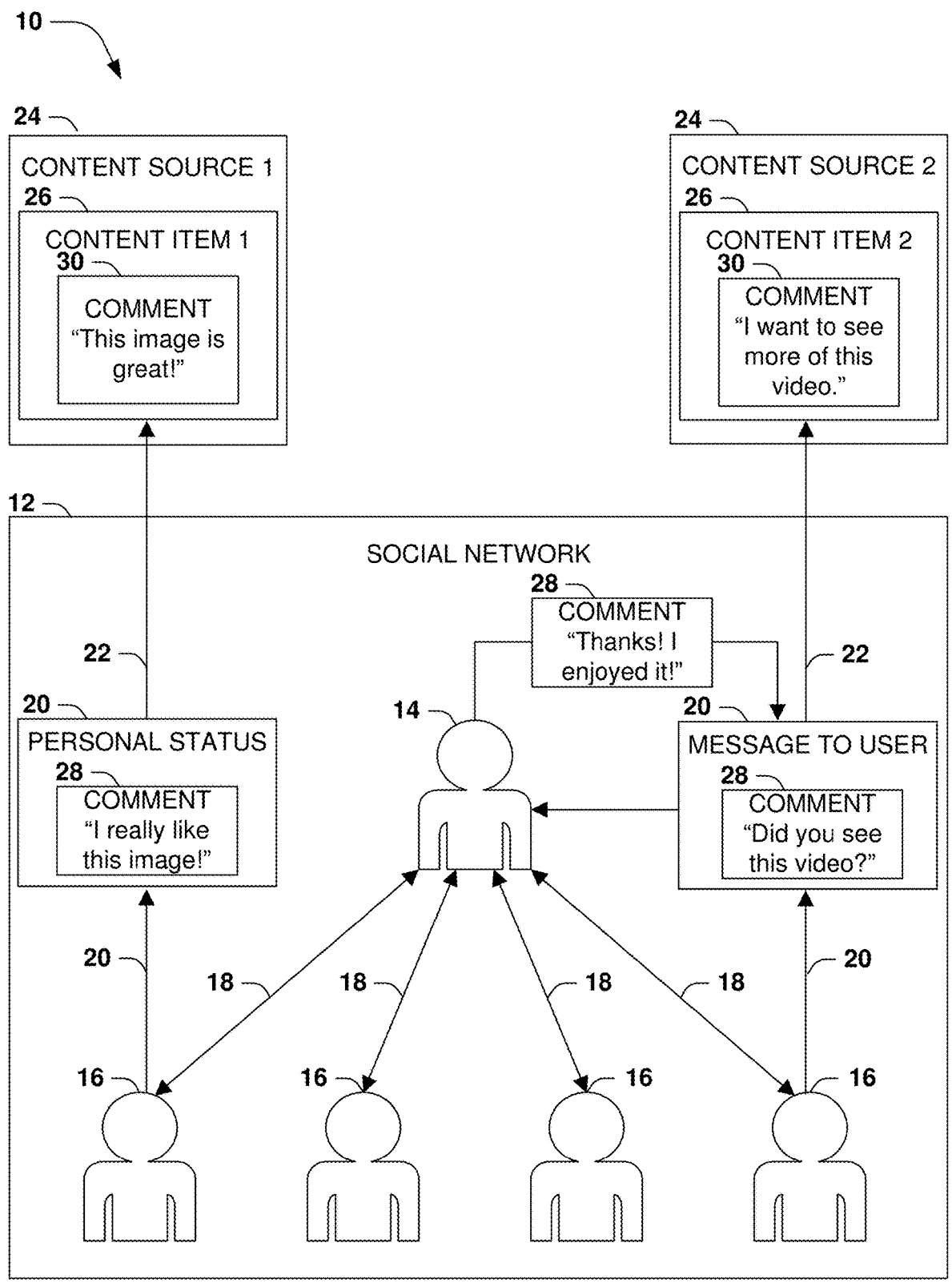
FIG. 1 is an illustration of an exemplary scenario featuring users of a social network sharing and viewing content items hosted by content sources and shared within the social network.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

Within the field of computing, many scenarios involve a social network comprising a representation of a set of individuals and relationships thereamong. Such relationships may represent, e.g., familial relations, friendships, shared membership in a group or activity, or academic or professional relationships. The social network may permit a user to establish a set of contacts with whom the individual shares a relationship. The users of the social may then exchange messages with one or more contacts, such as public status messages that may be viewed by all contacts of the user, public or private messages sent to one or more contacts, or chat messages exchanged in a realtime chat environment.

A social network also allows a user to share one or more content items with other users, such as documents, images, audio and video recordings, and executable applications. In some scenarios, the user may upload the content item to the social network, which may store the content item and may present a copy of the content item to contacts who request access to the content item. In other scenarios, the user may provide a reference to a content item hosted by a content source outside of the social network, such as a web page of a website, an image of an image repository, an audio or video recording hosted by an audio or video repository, or a file hosted by a file sharing service. In these cases, the user may provide a reference to the content item shared by the content source, such as a uniform resource identifier (URI) within the domain of the content source. The social network may allow the user to share the reference to one or more contacts, who may use the reference (such as clicking on a hyperlink associated with the URI of the content item) in order to view the content item in the context of the content source (e.g., by navigating to the web page of the content source where the content item is presented). The user and his or her contacts may also submit comments in response to the content item and/or in response to other comments to the content item. Such comments may either be posted at the content source (e.g., within the web page of a website of the content source) or within the social network (e.g., associated with the reference shared by the user).

FIG. 1 presents an exemplary scenario 10 featuring a social network 12 comprising a user 14 who has established a set of relationships 18 with a set of contacts 16. The relationships 18 may represent, e.g., real-world familial relationships, friendships, academic or professional associations, shared membership in an organization, or shared traits or interests in a particular online or offline activity. Within the social network 12, various contacts 16 having a relationship 18 with the user 14 may generate one or more messages 20 involving a reference to a content item 26 hosted by a content source 24. For example, a first contact 16 having a relationship 18 with the user 14 may author a first message 20 comprising a personal status message that is viewable by anyone having a relationship 18 with the first contact 16, including the user 14, wherein the personal status message includes a reference 22 to a first content item 26 hosted by a first content source 24. The first contact 16 may also include in the first message 20 a comment 28 about the first content item 26. This first comment 28 may be stored by the social network 12 and displayed with the reference 22 when the user 14 requests to view the first message 20. A second comment 30 about the first content item 26 may have been sent to the first content source 24 and stored in association with the first content item 26, such that when the user 14 requests to view the first content item 26 at the first content source 24, the second comment 30 is displayed. Similarly, a second contact 16 having a relationship 18 with the user 14 may author a second message 20 comprising a public or private message addressing the user 14 This personal or private message includes a reference 22 to a second content item 26 hosted by a second content source 24. The second contact 16 may also include in the second message 20 a comment 28 about the second content item 26, which may be stored by the social network 12 and displayed with the reference 22 when the user 14 requests to view the second message 20. A second comment 30 about the second content item 26 may have been sent to the second content source 24 and stored in association with the second content item 26, such that when the user 14 requests to view the second content item 26 at the second content source 24, the second comment 30 is displayed. Additionally, the user 14 may generate a response to the comments 28, such as a third comment 28. The responsive comment 28 of the user 14 may be sent to and stored by either by the social network 12 in association with a comment 28 associated with a message 20 within the social network 12, or by the content source 24 in association with a content item 26.

In the manner illustrated in the exemplary scenario 10 of FIG. 1, some social networks 12 and content sources 24 may facilitate discussions about content items 26 shared within the social network 12. However, several disadvantages may be apparent within this exemplary scenario 10. As a first example, in order to view a particular content item 26 shared within the social network 12, the user 14 may have to navigate from the domain of the social network 12 to the domain of the content source 24 (e.g., by clicking a hyperlink provided within the social network 12 to view a different web page within the content source 24 where the content item 26 is presented), and may then have to navigate back to the domain of the social network 12. These domain transitions may be distracting, and may disrupt a smooth user experience. As a second example, comments 28 to a content item 26 may be distributed between the content source 24 and the social network 12. For example, with respect to a particular content item 26 stored by a content source 24, some comments 28 may have been submitted in response to the message 20 within the social network 12 containing the reference 22 to the content item 26, while other comments 30 may have been submitted to the content source 24 while a user 14 is viewing the content item 26. This distribution may result in two distinct sets of comments 30 presented in two different locations with no crossover. Moreover, a user 14 may read a first comment 28 posted in a first location, but may inadvertently submit a second comment 30 replying to the first comment 28 to a second location, resulting in an apparently non sequitur response in the second location and an absence of the response in the first location.

These disadvantages may be exacerbated in more complex scenarios. For example, the user 14 may belong to several social networks 12, and may receive many messages 20 including references 22 to content items 26 stored by many content sources 24. The comments 28 to the content items 26 may therefore be distributed across several social networks 12 and several content sources 24, and the user 14 may have to visit many different locations in order to view all of the comments 28. This complexity may be further enhanced by differences in user interfaces among the social networks 12 and/or content sources 24. As a first example, comments 28 may be presented in a different visual manner in each location, leading to frequent transitions among different aesthetics. As a second example, the user interface for submitting a comment 28 in response to a content item 26 or another comment 28 may be different for each location, and the user 14 may have to remember different login credentials for each location and the proprietary details of the user interface for each location. Together, these complexities may impose a significant inefficiency in the user experience of a user 14 endeavoring to view messages 20, content items 26, and comments 28 distributed across and differently presented by widely disparate social networks 12 and content sources 24.

Presented herein are techniques for improving the consistency of the user experience of a user 14 while interacting with a content item 26 hosted by a content source 24 and shared with the user 14 within a social network 12. In accordance with these techniques, a device may track the sharing of content items 26 with the user 14 (e.g., references to content items 26 posted within personal status messages of contacts 16 of the user 14, in public and private messages 20 addressing the user 14, and in chat messages sent to the user 14), as well as the content source 24 hosting the respective content items 26. The device may also track comments 28 associated with the content item 26 (either directly in response to the content item 26 or in response to other comments 28) that are stored by the social network 12 and/or the content sources 24. However, the content items 26 shared with the user 14 (as well as comments 28 thereto) may be numerous and varied, so the presentation of an aggregated stream of content items 26 may be voluminous and/or haphazard (e.g., a jumbled collection of documents, images, audio and video recordings, and files), so it may be desirable to narrow the presentation of shared content items 26 to those that are similar to another content item 26 that the user 14 is currently viewing. In particular, it may be desirable to detect when the user 14 is requesting a presentation of a content source 24, and to integrate with the presentation of the content source 24 the shared content items 26 that are hosted by the content source 24, and that contacts 16 of the user 14 have shared with the user 14 within the social network 12. In addition to reducing the number of presented content items 26 and promoting a similarity of presented content items 26 to those that the user 14 may already be viewing (since, e.g., a particular content source 24 typically hosts a set of content items 26 having a similar type, topic, or cultural appeal), this technique also improves the smoothness of the user experience of the user 14 by avoiding a transition of domains between viewing a current content item 26 and viewing a shared content item 26 that is hosted by the same content source 24.

Figure 2:
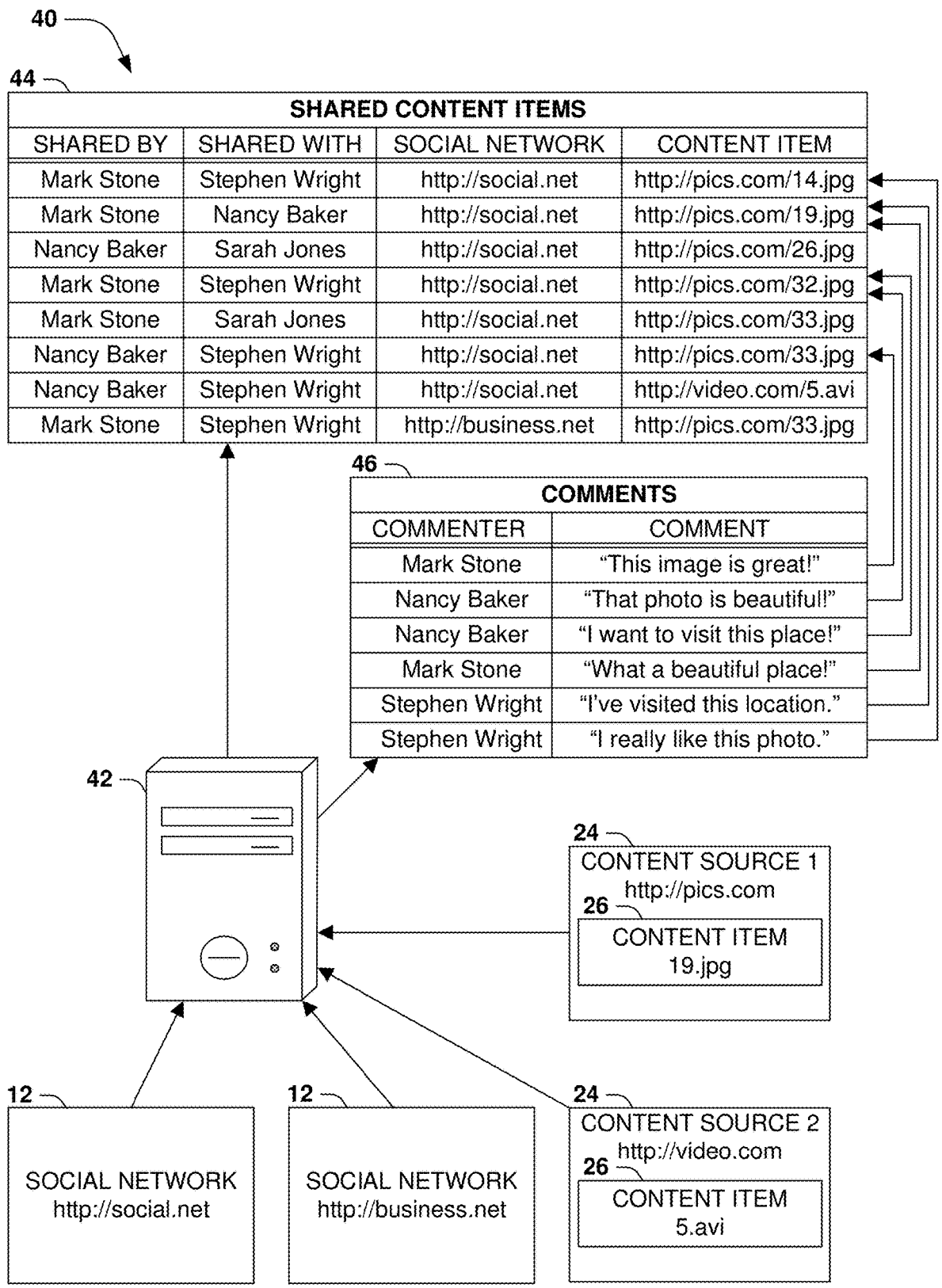
FIG. 2 is an illustration of an exemplary scenario featuring a device configured to retrieve content items respectively hosted by a content source and shared with a user within a social network in accordance with the techniques presented herein.

FIG. 2 presents an exemplary scenario 40 featuring a device 42 configured to monitor one or more social networks 12 in order to detect a sharing within the social network 12 of one or more content items 26 with a user 14. In accordance with these techniques, a device 42 may be configured to access the social networks 12, e.g., in a push manner (such as where the social networks 12 actively notify the device 42 when a contact 16 shares a content item 26 with the user 14) and/or in a pull manner (such as by configuring the device 42 to, on a periodic basis, retrieve the content items 26 shared by one or more contacts 16 with the user 14). The monitoring of the content items 26 may include the monitoring and retrieval of comments 28 associated therewith. The device 42 may record such detected content items 26 and comments 28, as well as the content sources 24 hosting these content items 26. For example, the device 42 may generate a content item data set 44 (such as a table in a relational database) recording, for various instances of a content item 26 by a contact 16 with a user 24, the identities of the entities sharing the content item 26 and with whom the content item 26 has been shared, and a reference 22 to the content item 26 including an indicator of the content source 24 hosting the content item 26. The device 42 may also store, e.g., an indicator of the social network 12 within which the instance of the sharing occurred. The device 42 may also record, in a comment data set 46 (or, alternatively, in the content item data set 42), the comments 28 submitted with respect to the content items 26 (either directly in response to a content item 26 or in response to another comment 28). The device 42 may maintain these records of the shared content items 26 and contents 28 when a user 14 requests a presentation of a content source 24.

Figure 3:
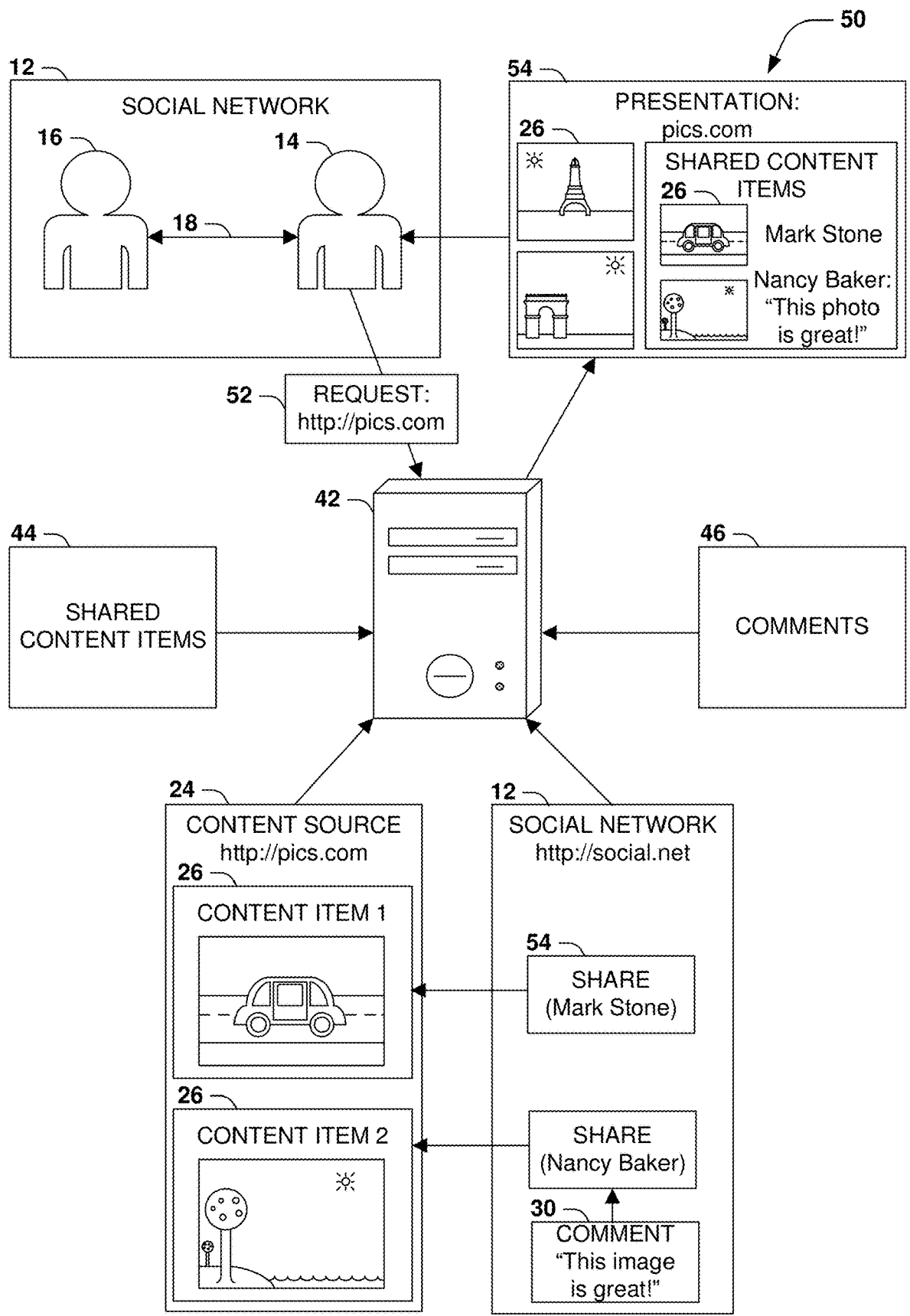
FIG. 3 is an illustration of an exemplary scenario featuring a presentation of content items hosted by a content source and shared with a user of a social network in accordance with the techniques presented herein.
Figure 4:
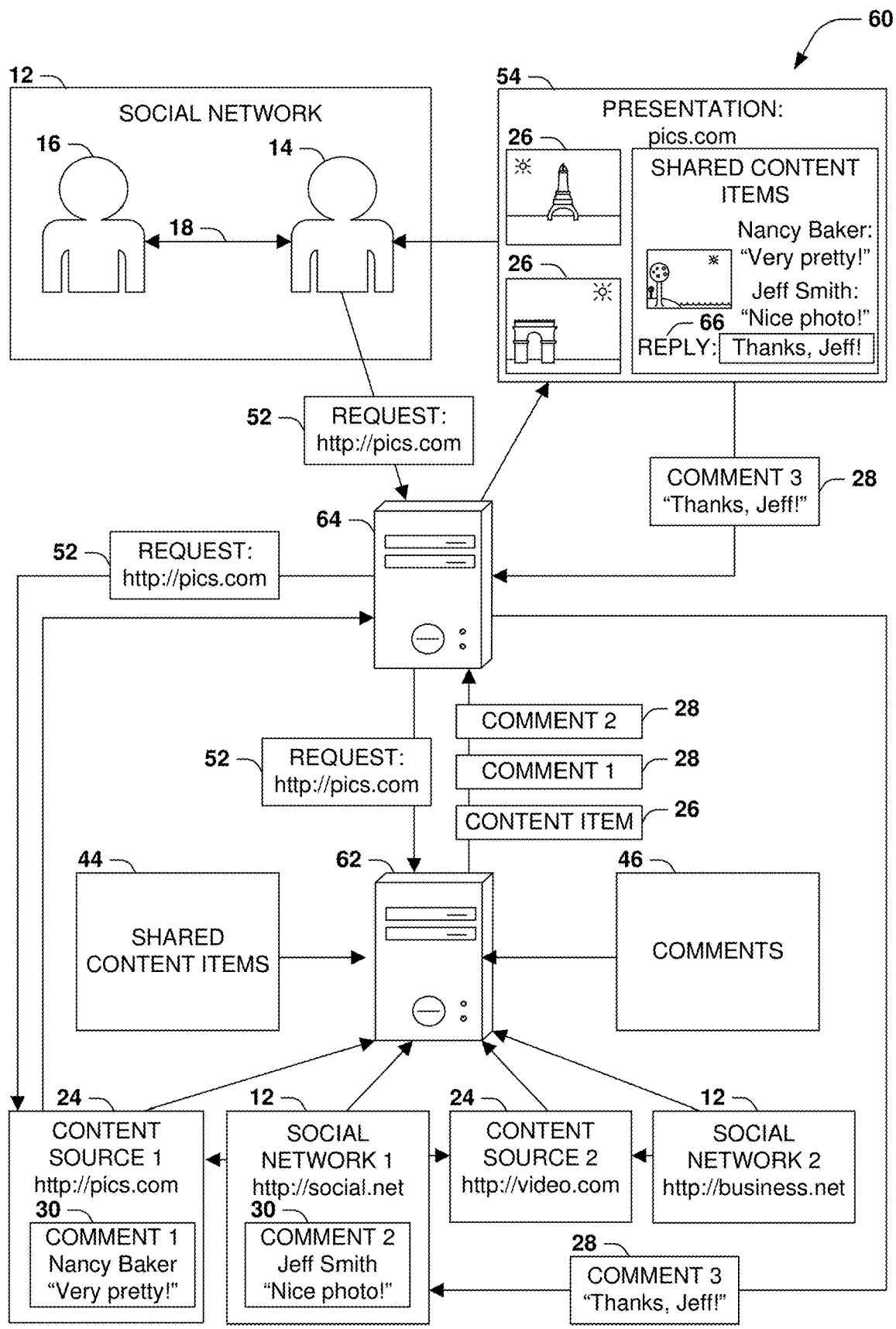
FIG. 4 is an illustration of another exemplary scenario featuring a presentation of content items hosted by a content source and shared with a user of a social network in accordance with the techniques presented herein.

The information gathered in the exemplary scenario 40 of FIG. 2 may be used in various ways. FIGS. 3 and 4 present two exemplary scenarios featuring two similar, but alternative, uses of this information, but those of ordinary skill in the art may devise other uses that are compatible with the techniques presented herein.

FIG. 3 presents a first exemplary scenario 50 of the techniques presented herein, wherein a user 14 may submit to a device 42 a request 52 for a presentation 54 of a content source 24, e.g., by navigating to the content source 24 in a web browser. The device 42 may comprise, e.g., an additional configuration of the device 42 in the exemplary scenario 40 of FIG. 2, such as a client-operated device that both monitors the social networks 12 and that presents content sources 24 to the user 14 upon request. The device 42 may therefore accept the request 52 and may examine the records indicating the shared content items 26 and/or comments 28 gathered in the exemplary scenario 40 of FIG. 2. For example, if the user 14 submits a request 52 for a presentation 54 of the content source 24 accessible at the URI "http://pics.com", the device 42 may search the content item data set 44 for content items 26 shared with the user 14 within the social network 12 and hosted by this content source 24 (e.g., featuring a reference 22 that includes this URI). The device 42 may then generate a presentation 54 of the content source 24, e.g., by contacting the content source 24 as requested by the user 14, by rendering a web page based on the web components sent by the content source 24, and by displaying for the user 14 the rendered web page in a web browser. However, in accordance with the techniques presented herein, the device 42 may include in the presentation 54 of the content source 24 the content items 26 that are hosted by the content source 24 and that have been shared with the user 14 by a contact 16 within a social network 12. For example, for a content source 24 comprising an image database, the user 14 may submit a URI associated with a particular image that the user 14 wishes to view. The device 42 may detect the content source 24, and by searching the content item data set 26, may identify other images hosted by the image database that have been shared with the user 14 within the social network 12. These other images may be included in the presentation 42; e.g., in a peripheral region of the web page for the image that the user 14 requested to view, the device 42 may insert a list of thumbnail versions of other images that have been shared with the user 14. Additionally, the device 42 may, by searching the comment data set 46, present comments 28 associated with the shared content items 26. In this manner, the device 42 may assist the user 14 in viewing shared content items 26, including comments 28 related thereto, without having to leave the content source 24.

FIG. 4 presents a second exemplary scenario 60 of the techniques presented herein, wherein a user 14 may submit a request 52 for a presentation 54 of a content source 24, e.g., by navigating to the content source 24 in a web browser. In accordance with the techniques presented herein, and in a similar manner as illustrated in the first exemplary scenario 50 of FIG. 3, the content item data set 44 may be examined to retrieve content items 26 that are hosted by the same content source 24 and that have been shared with the user 14 within a social network 12. However, this second exemplary scenario 60 of FIG. 4 differs from the first exemplary scenario 50 of FIG. 3 in a few key aspects. As a first example, a content item server 62 may be configured to monitor the social network 12 and to record the sharing of content items 26 (e.g., by generating the content item data set 44 and the comment data set 46). This content item server 62 may comprise, e.g., one or more servers that are dedicated to this monitoring and recording on behalf of a potentially large number of users 14 of the social network 12. Additionally, a particular user 14 may operate a client 64 (such as a personal computer or a mobile phone) that is configured to receive from the user 14 the request 52 for a presentation 54 of a content source 24. The client 64 may be configured to forward the request 52 to the content item server 62, which may notify the client 64 of the content items 26 hosted by the same content source 24 that have been shared with the user 14 within a social network 12 (possibly including the comments 28 related thereto). The client 64 may then receive these content items 26 and may include them in the presentation 54 of the content source 24 to the user 14 (e.g., by inserting in a peripheral region of a web page presenting the content source 24 a list of preview versions of the shared content items 26). While the second exemplary scenario 60 in FIG. 4 is more complex than the first exemplary scenario 50 of FIG. 3, this second exemplary scenario 60 may present distinct advantages. For example, by configuring the monitoring in a separate content item server 62 that is separate from the client 64 operated by the user 14, this architecture may present higher scalability to service a larger body of users 14 and/or to monitor a wider set of social network 12. This architecture may also reduce the cost of monitoring the social network 12 (since the content item server 62 may monitor the social network 12 on behalf of many users 14, instead of each user 14 operating a different device 42 that monitors the social network 12).

The exemplary second scenario 60 of FIG. 4 also features some additional advantages that may be implemented in some embodiments of these techniques (and that, although not so illustrated, may also be implemented in the exemplary first scenario 50 of FIG. 3). As a first example, the content item server 62 is configured to monitor a plurality of social networks 14; e.g., a user 14 may belong to a first social network 14 to establish casual relationships 18 such as familial relationships and friendships, and a second social network 14 to establish professional relationships 18 such as academic and business connections. By monitoring several social networks 14, the content item server 62 may aggregate the presentation of content items 26 to the user 14, e.g., by including within a presentation 54 of a content source 24 the content items 26 hosted by the content source 24 and shared with the user 14 within many social networks 14, thereby further reducing transitions between domains (e.g., as opposed to the user 14 having to visit several social networks 12 in order to consume the shared content items 26) and further improving the smooth user experience of the user 14. As a second example, the embodiment may permit the user 14 to submit a comment 28 regarding a content item 26, which may be propagated back to the social network 14 without having to leave the content source 24. For example, the presentation 54 of the content source 24 may include a comment control 66 that accepts a comment 28 from the user 14 regarding a shared content item 26. The embodiment may then receive the comment 66, may identify the social network 12 where the content item 26 was shared with the user 14 (particularly if several social networks 12 are monitored), and may send the comment 28 to the social network 12 for association with the content item 26. Similarly (though not so illustrated), an embodiment may permit the user 14 to, while viewing a content item 26 hosted by the content source 24, request to share the content item 26 with one or more contacts 16 within a social network 12. The embodiment may then send the content item 26 to a social network 14 for sharing (e.g., to be posted as a personal status message or in a public or private message to one or more contacts 16 of the user 14 within the social network), thereby allowing the user 14 to share content items 26 within the social network 12 without having to leave the content source 24. These and other features may be included in various embodiments of these techniques in order to improve the smooth user experience of the user 14 while interacting with one or more social networks 12 and one or more content sources 24.

Figure 5:
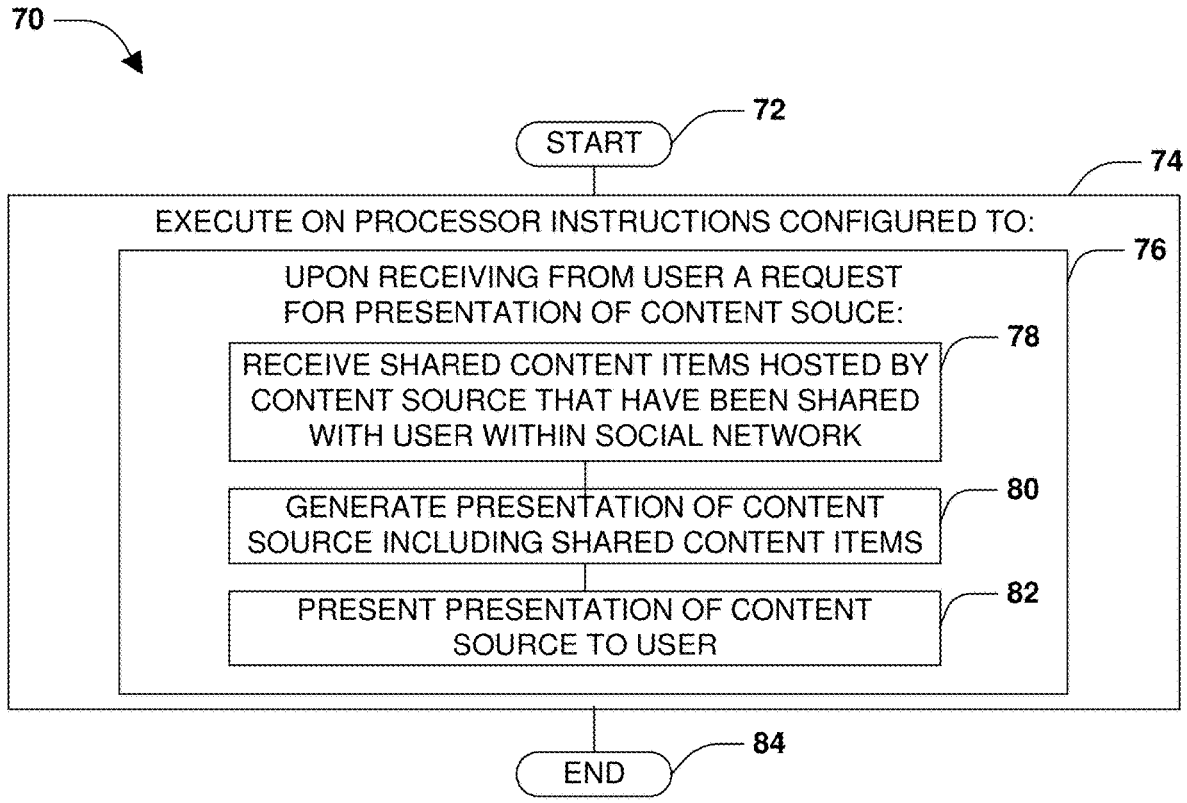
FIG. 5 is a flow chart illustrating an exemplary method of presenting content items shared with a user within a social network in accordance with the techniques presented herein.

FIG. 5 presents a first embodiment of these techniques, illustrated as an exemplary method 70 of presenting content items 26 to users 14 within a social network. This exemplary method 70 may be implemented, e.g., as a set of software instructions stored in a memory component of a device 42, such as a system memory circuit, a platter of a hard disk drive, a solid-state storage device, or a magnetic or optical disc, where such instructions are configured to implement the techniques presented herein. This exemplary method 70 begins at 72 and involves executing 74 the instructions on a processor of the device 42. In particular, the instructions may be configured to, upon receiving from the user 14 a request 52 for a presentation 54 of a content source 24, receive 76 shared content items 26 that are hosted by the content source 24 and that have been shared with the user 14 within the social network 12 (possibly including the comments 28 associated with such content items 26). The instructions are also configured to, upon receiving 78 from the user 14 a request 52 for a presentation 54 of a content source 24, generate 80 a presentation 54 of the content source 24 that includes the shared content items 26, and present 82 the presentation 54 of the content 24 source to the user 14. In this manner, the exemplary method 70 achieves the presentation of the shared content items 26 to the user 14 in accordance with the techniques herein (in particular, as the device 42 in the exemplary scenario 50 of FIG. 3 or as the client 64 in the exemplary scenario 70 of FIG. 4), and so ends at 84.

Figure 6:
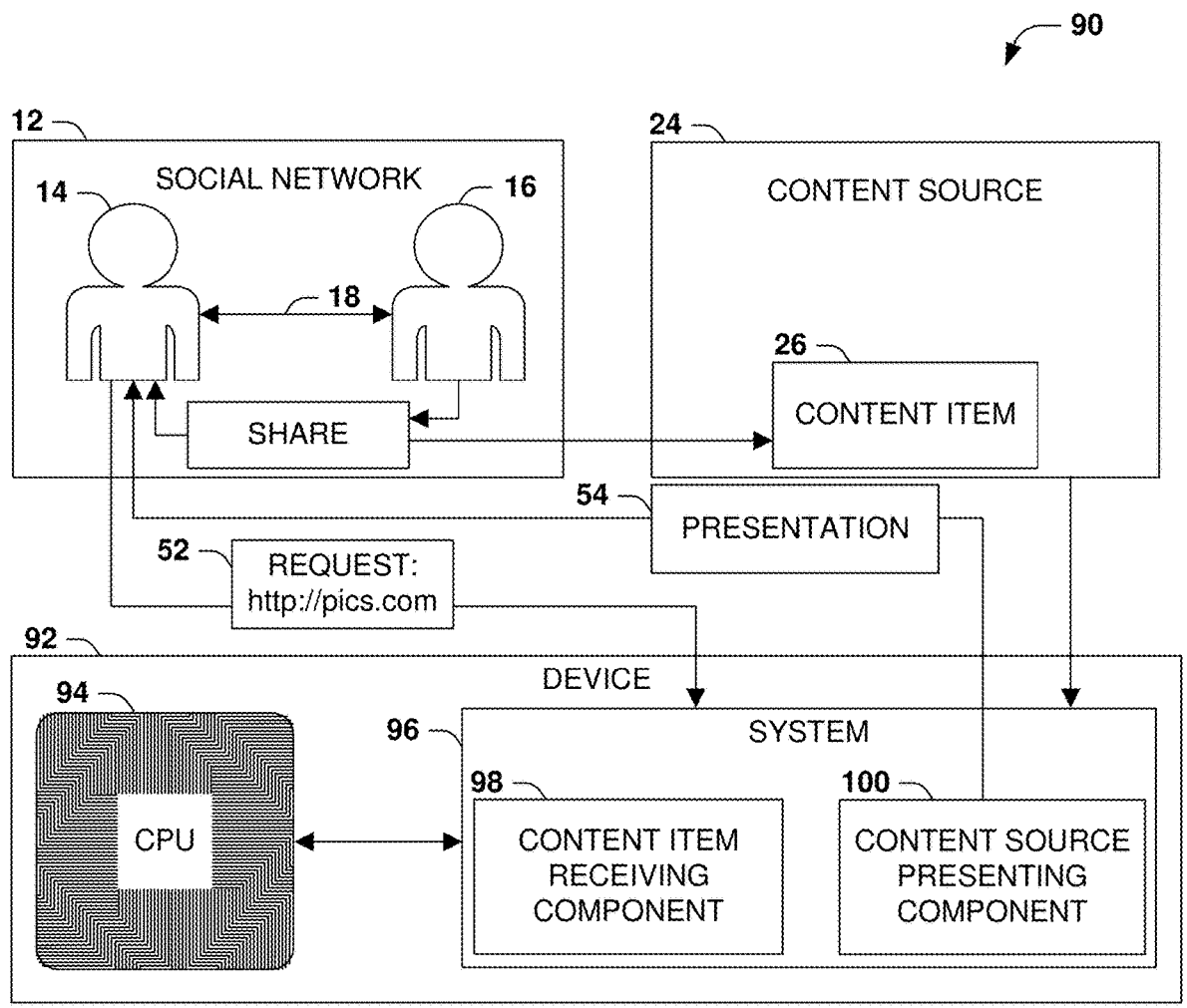
FIG. 6 is a component block diagram illustrating an exemplary system for presenting content items shared with a user within a social network.

FIG. 6 presents a second embodiment of these techniques, illustrated as an exemplary system 96 operating on a device 92 having a processor 94, where the device 92 is configured to present to a user 14 content items 26 that have been shared with the user 14 within one or more social networks 12. The exemplary system 96 may be implemented, e.g., as a set of interoperating components that interoperate to perform the techniques presented herein. Each component of the exemplary system 96 may be implemented, e.g., as a set of software instructions stored in a memory component of a device 42, such as a system memory circuit, a platter of a hard disk drive, a solid-state storage device, or a magnetic or optical disc; as one or more hardware components, e.g., a circuit or a field-programmable gate array (FPGA) programmed to perform a particular element of these techniques; or a combination thereof. The exemplary system 96 includes a content item receiving component 98, which is configured to, upon receiving from the user 14 a request for a presentation 54 of a content source 24, receive shared content items 26 that are hosted by the content source 24 that have been shared with the user 14 within the social network 12 (possibly including the comments 28 associated with such content items 26). The exemplary system 96 also includes a content source presenting component 100, which is configured to, upon receiving from the user 14 a request 52 for a presentation 54 of the content source 24, generate a presentation 54 of the content source 24 including the shared content items 26, and present the presentation 54 of the content source 24 to the user 14. In this manner, the exemplary system 96 of FIG. 5 achieves the presentation of the shared content items 26 to the user 14 in accordance with the techniques herein (in particular, as the device 42 in the exemplary scenario 50 of FIG. 3 or as the client 64 in the exemplary scenario 70 of FIG. 4).

Figure 7:
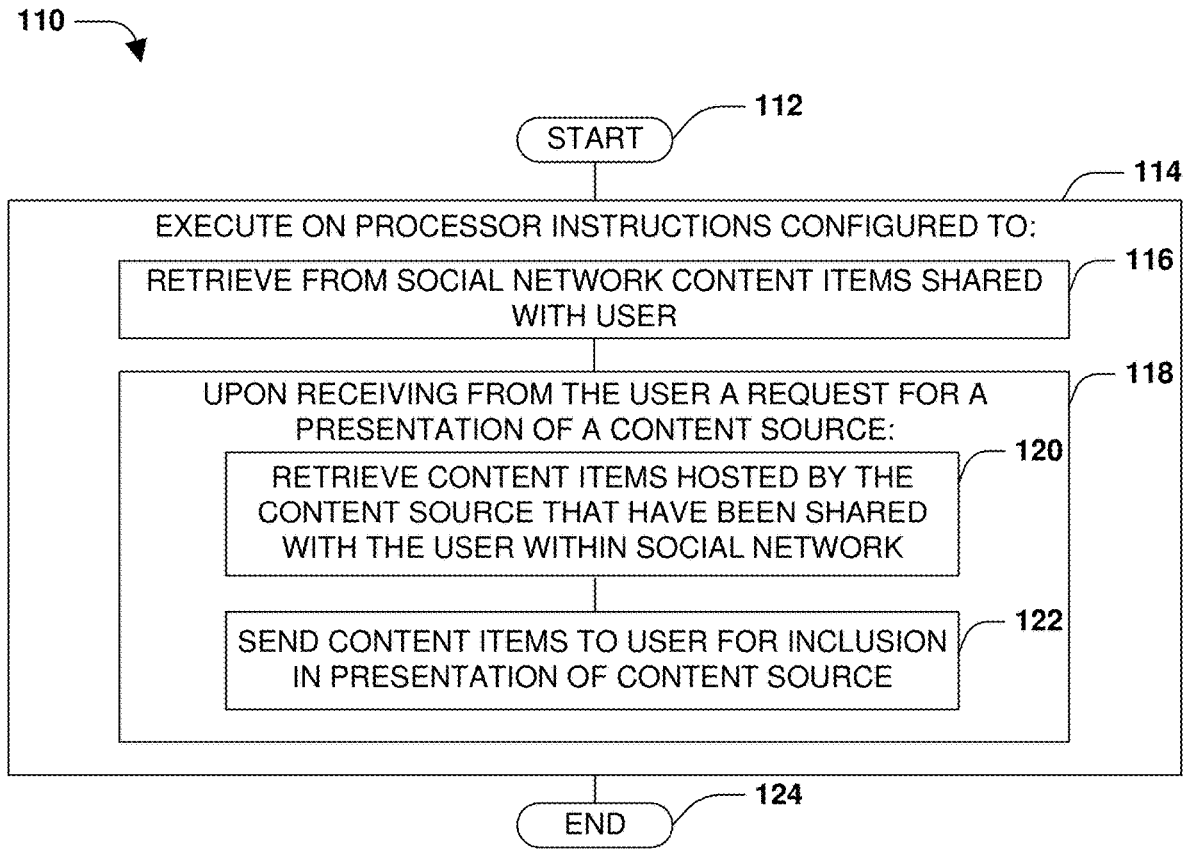
FIG. 7 is a flow chart illustrating another exemplary method of presenting content items shared with a user within a social network.

FIG. 7 presents a third embodiment of these techniques, illustrated as another exemplary method 110 of presenting content items 26 to users 14 within a social network. This exemplary method 110 may be implemented, e.g., as a set of software instructions stored in a memory component of a device 42 (e.g., a content item server 62), such as a system memory circuit, a platter of a hard disk drive, a solid-state storage device, or a magnetic or optical disc, where such instructions are configured to implement the techniques presented herein. The exemplary method 110 begins at 112 and involves executing 114 the instructions on a processor 94 of the device 42. In particular, the instructions are configured to retrieve 116 from the social network 12 the content items 26 shared with the user 14 (possibly including the comments 28 associated with such content items 26). The instructions are also configured to, upon receiving 118 from the user 14 a request 52 for a presentation 54 of a content source 24, retrieve 120 the content items 26 hosted by the content source 24 that have been shared with the user 14 within the social network 12, and send 122 the content items 26 to the user 14 (e.g., to a client 64 operated by the user 14) for inclusion in the presentation 54 of the content source 24. In this manner, the exemplary method 110 achieves the presentation of the shared content items 26 to the user 14 in accordance with the techniques herein (in particular, as the content item server 62 in the exemplary scenario 70 of FIG. 4), and so ends at 124.

Figure 8:
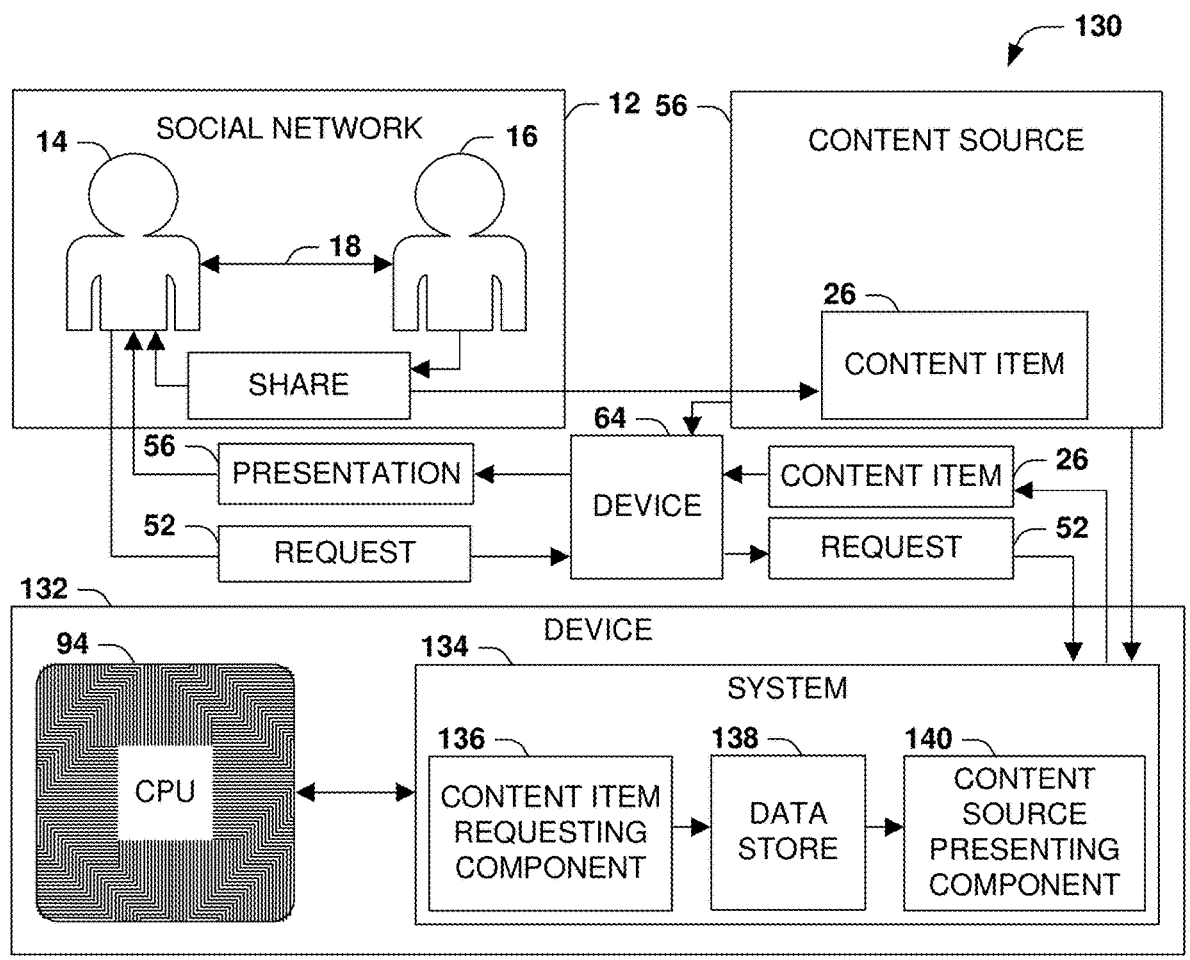
FIG. 8 is a component block diagram illustrating another exemplary system for presenting content items shared with a user within a social network.

FIG. 8 presents a fourth embodiment of these techniques, illustrated as an exemplary system 134 operating on a device 132 having a processor 94, where the device 132 is configured to present to a user 14 content items 26 that have been shared with the user 14 within one or more social networks 12. The exemplary system 134 may be implemented, e.g., as a set of interoperating components that interoperate to perform the techniques presented herein. Each component of the exemplary system 96 may be implemented, e.g., as a set of software instructions stored in a memory component of a device 42, such as a system memory circuit, a platter of a hard disk drive, a solid-state storage device, or a magnetic or optical disc; as one or more hardware components, e.g., a circuit or a field-programmable gate array (FPGA) programmed to perform a particular element of these techniques; or a combination thereof. The exemplary system 134 includes a data store 138 that is configured to store the content items 136 (e.g., in the form of the content item data set 44 and possibly the comment data set 46 illustrated in the exemplary scenario 40 of FIG. 2). The exemplary system 134 also includes a content item requesting component 136, which is configured to retrieve from the social network 12 the content items 26 (possibly including the comments 28 thereto) shared with the user 14, and to store the content items 26 in the data store 138. The exemplary system 134 also includes a content source presenting component 140, which is configured to, upon receiving from the user 14 a request 52 for a presentation 54 of a content source 24, retrieve from the data store 138 the content items 26 hosted by the content source 24 that have been shared with the user 14 within the social network 12, and send the content items 26 to the user 14 (e.g., to a client 64 operated by the user 14) for inclusion in the presentation 54 of the content source 24. In this manner, the exemplary system 134 achieves the presentation of the shared content items 26 to the user 14 in accordance with the techniques herein (in particular, as the content item server 62 in the exemplary scenario 70 of FIG. 4).

Still another embodiment involves a computer-readable medium comprising processor-executable instructions configured to apply the techniques presented herein. Such computer-readable media may include, e.g., computer-readable storage media involving a tangible device, such as a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a CD-R, DVD-R, or floppy disc), encoding a set of computer-readable instructions that, when executed by a processor of a device, cause the device to implement the techniques presented herein. Such computer-readable media may also include (as a class of technologies that are distinct from computer-readable storage media) various types of communications media, such as a signal that may be propagated through various physical phenomena (e.g., an electromagnetic signal, a sound wave signal, or an optical signal) and in various wired scenarios (e.g., via an Ethernet or fiber optic cable) and/or wireless scenarios (e.g., a wireless local area network (WLAN) such as WiFi, a personal area network (PAN) such as Bluetooth, or a cellular or radio network), and which encodes a set of computer-readable instructions that, when executed by a processor of a device, cause the device to implement the techniques presented herein.

Figure 9:
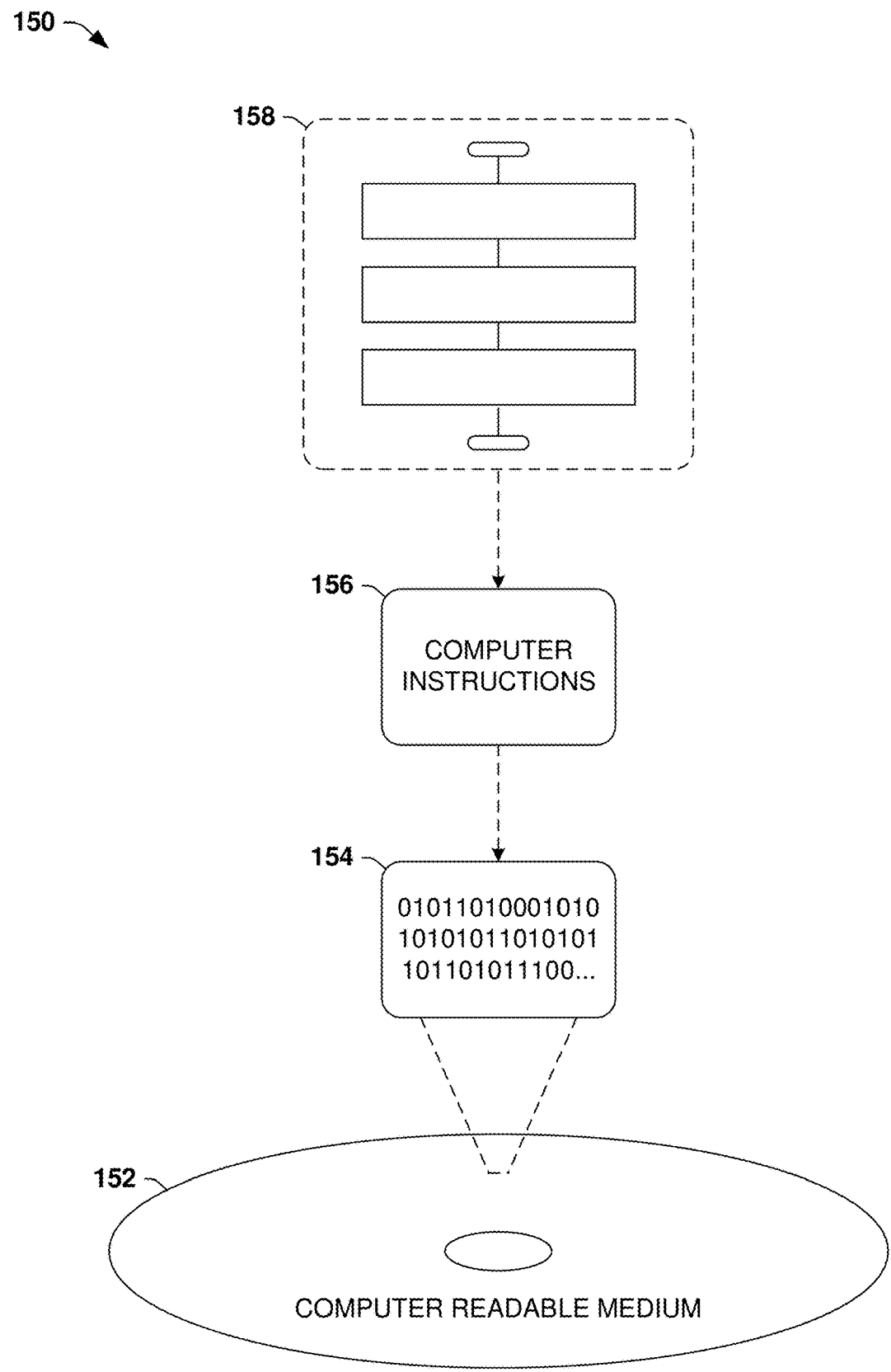
FIG. 9 is an illustration of an exemplary computer-readable medium comprising processor-executable instructions configured to embody one or more of the provisions set forth herein.

An exemplary computer-readable storage medium that may be devised in these ways is illustrated in FIG. 9, wherein the implementation 150 comprises a computer-readable medium 152 (e.g., a CD-R, DVD-R, or a platter of a hard disk drive), on which is encoded computer-readable data 154. This computer-readable data 154 in turn comprises a set of computer instructions 156 configured to operate according to the principles set forth herein. In one such embodiment, the processor-executable instructions 156 may be configured to perform a method of presenting content items shared with a user within a social network, such as the exemplary method 70 of FIG. 5 and/or the exemplary method 110 of FIG. 7. In another such embodiment, the processor-executable instructions 156 may be configured to implement a system for presenting content items shared with a user within a social network, such as the exemplary system 92 of FIG. 6 or the exemplary system 134 of FIG. 8. Some embodiments of this computer-readable medium may comprise a nontransitory computer-readable storage medium (e.g., a hard disk drive, an optical disc, or a flash memory device) that is configured to store processor-executable instructions configured in this manner. Many such computer-readable media may be devised by those of ordinary skill in the art that are configured to operate in accordance with the techniques presented herein.

The techniques discussed herein may be devised with variations in many aspects, and some variations may present additional advantages and/or reduce disadvantages with respect to other variations of these and other techniques. Moreover, some variations may be implemented in combination, and some combinations may feature additional advantages and/or reduced disadvantages through synergistic cooperation. The variations may be incorporated in various embodiments (e.g., the exemplary method 70 of FIG. 5, the exemplary system 92 of FIG. 6, the exemplary method 110 of FIG. 7, and/or the exemplary system 134 of FIG. 8) to confer individual and/or synergistic advantages upon such embodiments.

A first aspect that may vary among embodiments of these techniques relates to the scenarios wherein such techniques may be utilized. As a first example, these techniques may be applied to many types of social networks 12, including social networks representing real-world relationships such as familial relations and friendships; academic social networks representing connections among students and teachers; professional social networks representing professional associations among colleagues; and themed social networks representing connections among users 14 sharing an interest, such as participants in an online game. Additionally, an embodiment of these techniques may monitor a plurality of social networks 12, since a user 14 may have established social profiles on several such social networks 12 (e.g., a first social network 12 comprising a genealogy network involving familial relationships 18; a second social network 12 comprising a friendship network involving friend relationships 18; a third social network 12 comprising a professional network involving academic and colleague relationships 18; and a fourth social network 12 comprising an activity-oriented network for members of a shared activity, such as participation in an online game). The embodiment may also monitor such social networks 12 on behalf of a plurality of users 14 represented therein, and possibly scaling up to a large number of users 14 or even an entire population of one or more social networks 12.

As a second example of this first aspect, these techniques may be utilized to present users 14 with many types of content items 26, such as web pages hosted by a website, images hosted by an image database, audio or video recordings hosted by an audio or video sharing service, and files hosted by a file server. The content item 26 may also include a comment 28 related thereto, and/or one or more metadata items describing the sharing of the content item 26 and/or one or more comments 28, such as a title of the shared content item 26 or a date of the sharing of the content item 26 or authoring of the comment 28.

Figure 10:
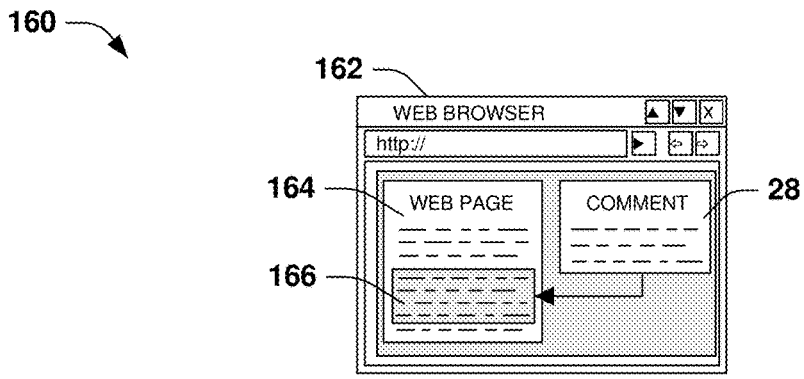
FIG. 10 is an illustration of an exemplary scenario featuring a presentation of a comment associated with a web page portion of a web page.

FIG. 10 presents an illustration of an exemplary scenario 160 featuring a particular type content item 26 hosted by a content source 24 that may be shared with users 14 of a social network 12 in accordance with the techniques presented herein. In this exemplary scenario 160, a web page 164 of a website may be rendered in a web browser 162. In some scenarios, a user 14 of a social network 12 may wish to share with his or her contacts 16 a reference 22 to the web page 164, possibly with a comment 28 relating to the content of the web page 164. However, in this exemplary scenario 160, the user 14 may wish to share a specific web page portion 166 of the web page 164, such as one or more words or phrases in a paragraph, one or more paragraphs in a document, one or more partitioned portions o the web page 164 (such as a table, a frame, or a DIV portion), one or more images embedded in the web page 164 or portions thereof, or an arbitrarily selected portion of the web page 164 (e.g., a web page portion 166 specified as a set of coordinates defining a region within the web page 164). An embodiment of these techniques may permit the user 14 to select and share the web page portion 166 of the web page 164, and to submit one or more comments 28 relating to the web page portion 166. When a contact 16 shares a web page portion 166 of a web page 164 with a user 14, and when the user 14 navigates to the content source 24 of the content item 26 (e.g., the domain hosting the web page 164), a presentation 54 of the website may indicate that one or more contacts 16 of the user 14 have shared one or more web page portions 166 of web pages 164 hosted by the domain, as well as the comments 28 submitted by such contacts 16. In this manner, the embodiments of these techniques may be used to enable users 14 of a social network 12 to annotate various web page portions 164 of the web pages 166 of a website, where such annotations are viewable by the contacts 16 of the user 14.

As a third example of this first aspect, a user 14 of a social network 12 may share a content item 26 with a contact 16 of the user 14 within the social network 12 in many ways. For example, a user 14 may submit a public status message that is not directed to any contact 16, but that is viewable by some or all contacts 16 of the user 14; a public or private message to a user 14, such as a private or public dialogue between the user 14 and one or more contacts 16; or a chat message in a realtime chat environment. Those of ordinary skill in the art may devise many scenarios wherein the techniques presented herein may be utilized.

A second aspect that may vary among embodiments of these techniques relates to the receiving of content items 26 hosted by content sources 24 that have been shared with the user 14 within a social network 12. As a first example, and as illustrated in the exemplary scenario 50 of FIG. 3, a device 42 operated by the user 14 may actively or passively monitor the sharing of content items 26 with the user 14 on one or more social networks 12, and may also generate presentations of content sources 24 to the user 14. For example, the user 14 may utilize a device 42 that monitors the social networks 12 as a background service while also fulfilling requests 52 from the user 14 for presentations of content sources 54 (e.g., a foreground web browser that the user 14 may operate to view web pages provided by content sources 54). Alternatively, and as illustrated in the exemplary scenario 70 of FIG. 4, the receiving may be performed by a content item server 62 that monitors the social network(s) 12 to identify shared content items 26, and that sends shared content items 26 to a client 64 operated by the user 14 that generates a presentation 54 of the content source 24 of the content items 26. The client 64 operated by the user 14 also receives the content items 26 in this scenario, but receives such content items 26 from the content item server 62 instead of from the social networks 12. For example, upon receiving a request 52 from a user 14 for a presentation 54 of a particular content source 24 (such as a particular website hosting a set of content items 26), the client 64 may notify a content item server 62 of the content source 24 for which the user 14 has requested a presentation 54, and may receive from the content item server 62 the content items 16 that are hosted by the content source 24 and that have been shared with the user 14 within one or more social networks 12.

As a second example of this second aspect, an embodiment of these techniques may communicate with one or more social networks 12 in various ways. As a first such example, the embodiment may communicate with the social network(s) 12 according to a push model, such as where the social networks 12 actively notify the embodiment when a contact 16 shares a content item 26 with the user 14. As a first such example, the embodiment may communicate with the social network(s) 12 according to a pull model, e.g., by configuring the embodiment to, on a periodic basis, retrieve the content items 26 shared by one or more contacts 16 with the user 14.

As a third example of this second aspect, an embodiment of these techniques may also receive from one or more social networks 12 comments 28 pertaining to various content items 26. A social network 12 may be configured to send the comments 28 along with content items 26 to which such comments 28 relate. Alternatively, the embodiment may query the social network 12 for content items 26, and may separately query the social network 12 for comments 28 to such content items 26. One such embodiment may query one or more social networks 12 for newly shared content items 26 at a different frequency than querying the same social networks 12 for comments 28 associated with previously shared content items 26. For example, it may be advantageous to configure the embodiment to poll a social network 12 to retrieve content items 26 at a first frequency, and to poll the social network 12 to retrieve comments 28 associated with the content items 26 at a second frequency that is higher than the first frequency (e.g., polling for newly shared content items 26 every ten minutes, but polling for comments 28 to content items 26 every two minutes). This configuration may be advantageous, e.g., for retrieving comments 28 to content items 26 more quickly, since such comments 28 may comprise a near-realtime conversation among the user 14 and his or her contacts 16 with a high value on promptly exchanged comments 28, while rapidly polling for the sharing of new content items 26 that may initiate a new conversation may be less valuable.

As a fourth example of this second aspect, shared content items 26 received from one social network 12 may be combined with shared content items 26 received from another social network 12. Alternatively or additionally, comments 28 to a content item 26 that have been posted on a first social network 12 may be combined with comments 28 to the same content item 26 posted by a second social network 12, and/or with comments 28 posted at the content source 14. For example, a content item 26 that is hosted by a content source 24 is shared with a user 14 within two social networks 14, the embodiment may receive and combine the comments 28 to the content item 26 posted within the first social network 12, the comments 28 to the content item 26 posted within the second social network 12, and the comments 30 to the content item 26 posted within the content source 24. These comments 28 may be combined by the embodiment (such as in the comment data set 46) to form a conversation unified among all of these disparate sources of comments 28.

As a fifth example of this second aspect, an embodiment of these techniques may retain the retrieved content items 26 and/or comments 28 thereto for a particular duration. For example, a content item server 62 may be configured to receive many content items 26 shared with many users 14 of one or more social networks 12. However, it may be advantageous to discard content items 26 and/or comments 28 that are older than a particular content item duration (such as one month after the date of sharing and/or commenting) in order to conserve the computing resources of the content item server 26. Those of ordinary skill in the art may devise many ways of configuring an embodiment to receive content items 26 while implementing the techniques presented herein.

A third aspect that may vary among embodiments of these techniques relates to the generation of a presentation 54 of a content source 24 and the content items 26 hosted by the content source 24 that have been shared with the user 14 within one or more social networks 12. As a first example, many presentations 54 of many types of content sources 24 may be generated. One such presentation 54 involves a request to render the content source 24 in a web browser, where an embodiment of these techniques may adjust the web page provided by the content source 24 in order to integrate into the content source 24 the content items 26 hosted by the content source 24 and shared with the user 14 within a social network 12. The web page may have been provided by the content source 24 in a state ready for such adjustment (e.g., if the content source 24 cooperatively structures the web page for the insertion of shared content items 26), or an embodiment of these techniques may adjust the web page even if the content source 24 does not provide the web page in such a form. In these embodiments, it may be convenient to implement the embodiment of these techniques as a web browser plug-in configured to adjust web pages according to this first example of this third aspect.

As a second example of this third aspect, the presentation 54 of a content source 24 may be adjusted in many ways to integrate shared content items 26. As a first such example, shared content items 26 that have been shared with the user 14 within a social network 12 may be included with other content items 26; e.g., if the user submits a search query for particular content items 26 within the content source 24, an embodiment may insert shared content items 26 into the search results (whether or not such shared content items 26 relate to the search query submitted by the user 14). Alternatively, the shared content items 26 may be presented separately from other content of the content source 24. For example, the shared content items 26 may be presented in a separate browser window; or, when the user 14 submits a search query to the content source 24, the shared content items 26 may be presented interstitially, after receiving the search query but before displaying the search results. In other such embodiments, the shared content items 26 may be presented peripherally with respect to the content of the content source 24 requested by the user 14. For example, if the user visits a web page within the domain of a content source 24, the resulting presentation 54 (such as the rendered web page) may comprise a primary presentation of the content source 24, and a secondary presentation comprising a content item list of shared content items 26, where the secondary presentation is positioned peripherally with respect to the primary presentation. The shared content items 26 may also be presented in full (e.g., as full-size images or embedded videos) and/or as preview versions (e.g., as thumbnail representations of full-size images, or as screen captures or segments of videos). In the latter scenario, respective preview versions of the content items 26 may be selectable to view a full version of the content item 26; e.g., a system embodiment of these claims may include a content item viewing component that, upon receiving from the user 14 a selection of a preview version of a content item 26, presents the full version of the content item 26.

As a third example of this third aspect, the presentation 54 of shared content items 26 may be adjusted in many ways. As a first such example, the shared content items 26 may be sorted, such as according to alphabetical or numerical order or popularity. The shared content items 26 may also be sorted according to relevance (e.g., with respect to details of the user 14 represented in a user profile; with respect to a content item 26 hosted by the content source 24 that is currently viewed by the user 14; or with respect to a search query submitted by the user 14 to the content source 24). As a second such example, the shared content items 26 included in the presentation 54 may be filtered in various ways; e.g., if the user 14 selects a particular social network 12 and/or a particular contact 16, the content items 26 included in the presentation 54 may be filtered to include only the content items 26 that have been shared with the user 14 within the selected social network 12 and/or by the selected contact 16. Filtering may also be implemented to improve the novelty of the presented content items 26 by recording the presentation of content items 26 to the user 14 and removing from the presentation 54 shared content items 26 that have been previously presented to the user 14. Filtering may also be implemented to reduce redundancy of presented content items 26; e.g., a particularly popular content item 26 may be redundantly hosted several times on one or more content sources 24, and may be shared with the user 14 multiple times (possibly including different references 18 and even different content sources 24), but an embodiment of these techniques may identify the redundancy and consolidate the presentation of the content item 26.

As a fourth example of this third aspect, one or more content items 26 may be associated with one or more comments 28 (either directly in response to the content item 26 or in response to other comments 28 associated therewith), and the presentation 54 of a content source 24 may include the comments 28 to content items 26 hosted by the content source 24. However, it may be undesirable to display all of the comments 28 to the content items 26 in the presentation 5; e.g., a popular content item 26 may be associated with many comments 28, and displaying all of the comments 28 may lead to an undesirably large presentation 54. Instead, for content items 26 associated with at least one comment 28, a comment indicator may be included in the presentation 54, and upon receiving a selection by the user of the comment indicator, one or more comments 28 associated with the content item 26 may be displayed.

Figure 11:
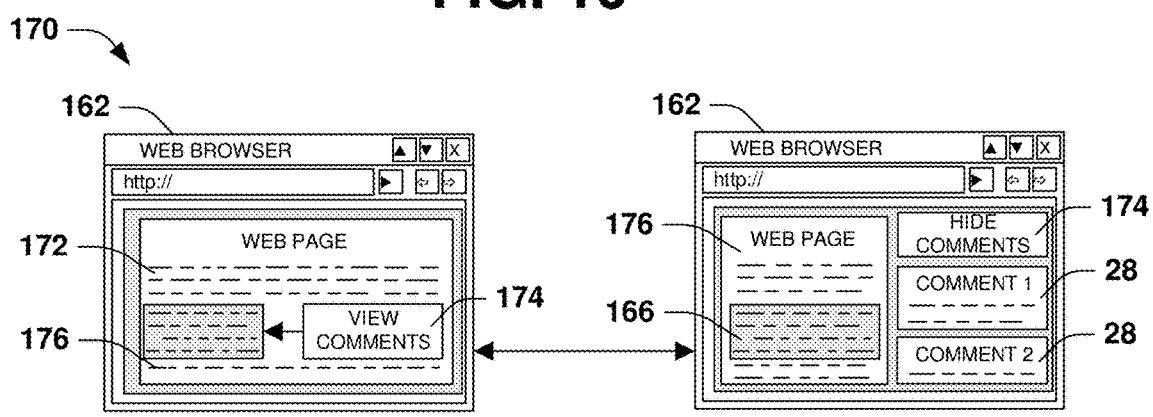
FIG. 11 is an illustration of an exemplary scenario featuring a toggling of comments associated with a content item shared by a content source.

FIG. 11 presents an illustration of an exemplary scenario 170 featuring a presentation 54 of a content source 16 including a toggling of the visibility of one or more comments 28 for a content item 26 comprising a web page portion 166 of a web page. In this exemplary scenario 170, a content item 26 is associated with one or more comments 28, but the comments 28 are not initially visible in the presentation 54. Rather, a comment indicator 172 may be presented near the content item 26 to indicate the existence of one or more comments 28 associated with the content item 26. When a user activates the comment indicator 172, some or all of the comments 28 may be displayed near the content item 26. Also, a second comment indicator 174 may be presented that, upon selection by the user 14, hides the comments 28 to the content item 26. In this manner, the embodiment in this exemplary scenario 170 permits a user 14 to view comments 28 associated with a content item 26 without overly cluttering the user interface of the presentation 54 of the content source 24.

Figure 12:
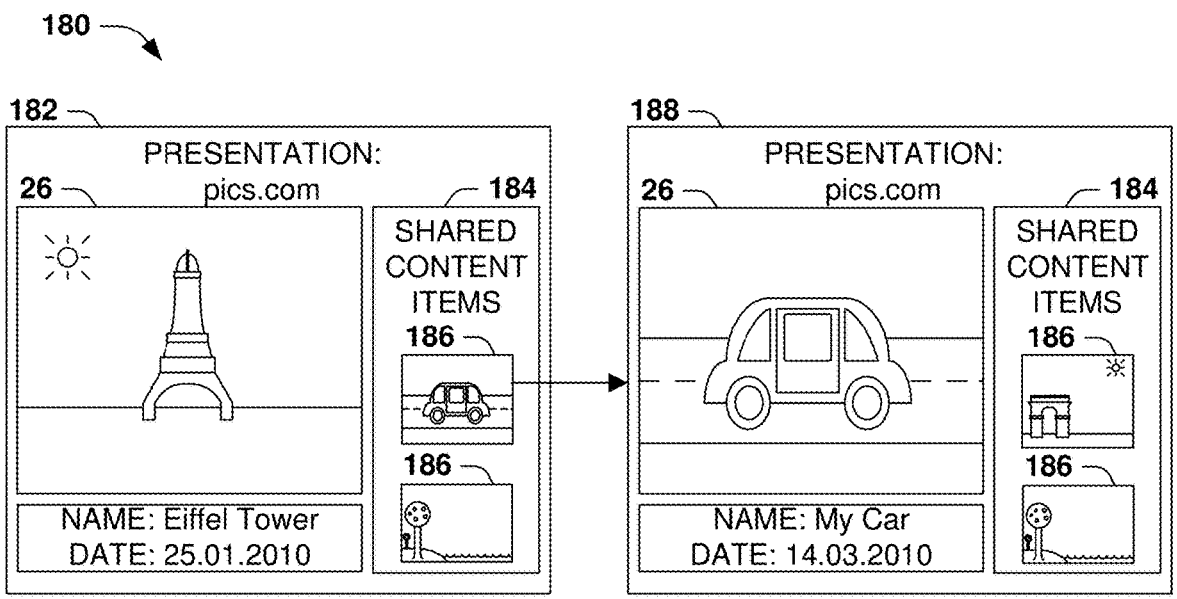
FIG. 12 is an illustration of an exemplary scenario featuring a peripheral presentation of preview versions of shared content items within a presentation of a content source.

FIG. 12 presents another illustration of an exemplary scenario 180 featuring a presentation 54 of a content source 24 including a shared content item 26, wherein the exemplary scenario 180 includes several of the variations presented herein. In this exemplary scenario 180, when a user 14 requests a presentation 54 of a content source 24 (in particular, a request to present a particular content item 26 hosted by the content source 24), an embodiment of these techniques may generate and present for the user 14 a first presentation 182 of the content source 24 that includes the requested content item 26, as well as several other content items 26 that are also hosted by the content source 24 and that have been shared with the user 14 within a social network 12. As a first example of the variations presented herein, the first presentation 182 includes a primary presentation of the selected content item 26 and a secondary presentation comprising a content item list 184 that is positioned peripherally with respect to the primary presentation. As a second example of the variations presented herein, the secondary presentation comprises a set of preview versions 186 (e.g., thumbnail representations) of shared content items 26. When the user 14 selects a preview version 186 of a particular shared content item 26, an embodiment may be configured to present a second presentation 188 of the content source 24 featuring the full version of the content item 26. As a third example of the variations presented herein, the set of shared content items 26 included in the secondary presentation may be filtered to remove content items 26 that have previously been presented to the user 14, including the selected content item 26 depicted in the second presentation 188. In this manner, the exemplary scenario 180 of FIG. 12 illustrates several variations of this third aspect in conjunction with the techniques presented herein.

As a fifth example of this third aspect, a presentation 54 of shared content items 26 hosted by a content source 24 as updates are received to the set of shared content items 26 or comments 28 thereto. Accordingly, an embodiment of these techniques may be extended (e.g., by adding a content item updating component to a system embodiment of these techniques) in order to update the presentation 54. As a first such example, upon receiving from a social network 12 an update to a content item 26 while presenting to the user 14 the content source hosting the content item, a content item server 62 may send the update to the user 14 (e.g., to a client 64 operated by the user 14) for inclusion in the presentation 54. As a second such example, upon receiving an update involving a content item 26 hosted by a content source 24 where the content item 26 has been newly shared with the user 14 within a social network 12 while the user 14 is viewing a presentation 54 of the content source 24, an embodiment may supplement the presentation 54 of the content source 24 with the content item 26. This supplementing may also include comments 28 to a content item 26; e.g., if a social network 12 receives a comment 28 to a content item 26 hosted by a content source 24 while a user 14 is viewing a presentation 54 of the content source 24, the presentation 54 may be supplemented by including the comment 28 to the content item 26. It may be particularly advantageous to configure an embodiment of these techniques to supplement the presentation 54 with newly received comments 28 promptly after such comments 28 are posted to the social network 12 in order to promote a sustained, near-realtime conversation about the content item 26, such as a chat session. Various technologies (such as push technologies) and/or protocols (such as Asynchronous Javascript and XML (AJAX)) may be utilized to achieve the updating of a presentation 54 such as a web page.

As a sixth example of this third aspect, an embodiment may be configured to adjust a presentation 54 of a content source 24 in order to permit additional user actions relating to these techniques that the user 14 may be allowed to perform. For example, an embodiment of these techniques may permit a user 14 viewing a content item 26 hosted by a content source 24 to share the content item 26 with one or more contact 16 within a social network 12, so that the user 14 does not have to transition from the content source 24 to a social network 12 in order to share the content item 26. For example, a presentation 54 of a content item 26 may include options for allowing the user 14 to send to a social network 12 a reference to 22 the content item 26 as a personal status message, or as a public or private message directed to one or more contacts 16, and may also permit the user 14 to include a comment 28 relating thereto. If the user 14 belongs to several social networks 12, the embodiment may send the content item 26 to all of the social networks 12 or to a default social network 12 among the set of social networks 12, or may allow the user 14 to specify one or more social networks 12 within which the content item 26 is to be shared. Similar extensions may be provided for receiving from the user 14 a comment 28 to a content item 26 and automatically sending the comment 28 to one or more social networks 12, so that the user 14 does not have to transition from the content source 24 to a social network 12 in order to submit the comment 28. Moreover, it may be advantageous to identify a social network within which the content item 26 was shared with the user 14, and to send the comment 28 to the identified social network 12. The presentation 54 may also permit a user 14 to edit and/or remove from the social network 12 a shared content item 26 (e.g., by deleting a personal status message or a public message sent to the user 14 that includes a reference 22 to the content item 26) and/or a comment 28 to a content item 26. Alternatively or additionally, the presentation 54 may be extended to permit other types of user actions, such as viewing a user profile of a contact 16 who has shared a content item 26 with the user 14 or initiating a public or private message or a chat session with a contact 16 who has shared the content item 26. A presentation 54 may be adjusted to support these additional user actions in many ways (e.g., by inserting user controls into the presentation 54 or providing a context menu including the user actions), and/or may be extensible by the user 24. Those of ordinary skill in the art may devise many ways of generating a presentation 54 of a content source 24 to a user 14 while implementing the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 13:
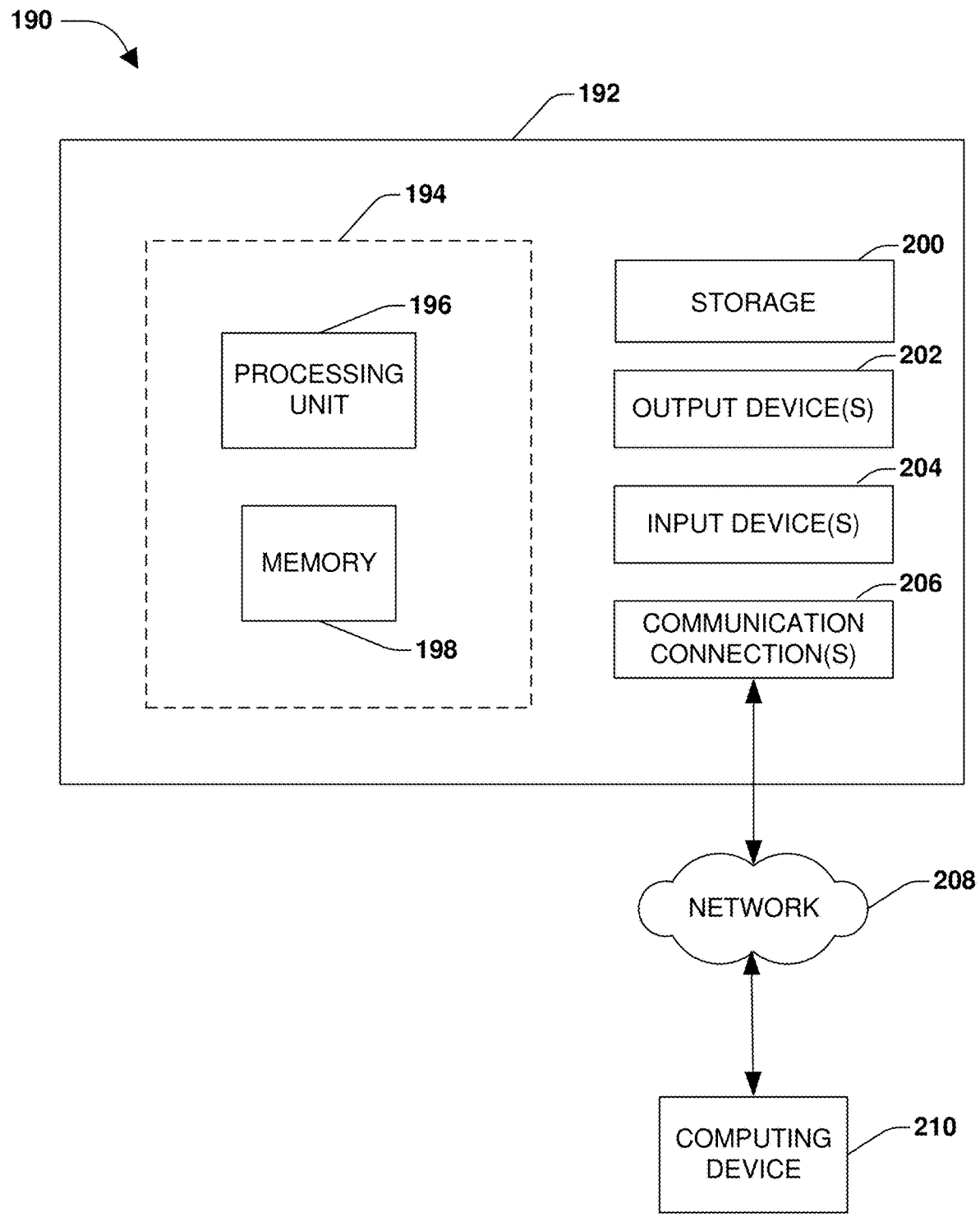
FIG. 13 illustrates an exemplary computing environment wherein one or more of the provisions set forth herein may be implemented.

FIG. 13 and the following discussion provide a brief, general description of a suitable computing environment to implement embodiments of one or more of the provisions set forth herein. The operating environment of FIG. 13 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 13 illustrates an example of a system 190 comprising a computing device 192 configured to implement one or more embodiments provided herein. In one configuration, computing device 192 includes at least one processing unit 196 and memory 198. Depending on the exact configuration and type of computing device, memory 198 may be volatile (such as RAM, for example), non-volatile (such as ROM, flash memory, etc., for example) or some combination of the two. This configuration is illustrated in FIG. 13 by dashed line 194.

In other embodiments, device 192 may include additional features and/or functionality. For example, device 192 may also include additional storage (e.g., removable and/or non-removable) including, but not limited to, magnetic storage, optical storage, and the like. Such additional storage is illustrated in FIG. 13 by storage 200. In one embodiment, computer readable instructions to implement one or more embodiments provided herein may be in storage 200. Storage 200 may also store other computer readable instructions to implement an operating system, an application program, and the like. Computer readable instructions may be loaded in memory 198 for execution by processing unit 196, for example.

The term "computer readable media" as used herein includes computer storage media. Computer storage media includes volatile and nonvolatile, removable and non-removable media implemented in any method or technology for storage of information such as computer readable instructions or other data. Memory 198 and storage 200 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 192. Any such computer storage media may be part of device 192.

Device 192 may also include communication connection(s) 206 that allows device 192 to communicate with other devices. Communication connection(s) 206 may include, but is not limited to, a modem, a Network Interface Card (NIC), an integrated network interface, a radio frequency transmitter/receiver, an infrared port, a USB connection, or other interfaces for connecting computing device 192 to other computing devices. Communication connection(s) 206 may include a wired connection or a wireless connection. Communication connection(s) 206 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 192 may include input device(s) 204 such as keyboard, mouse, pen, voice input device, touch input device, infrared cameras, video input devices, and/or any other input device. Output device(s) 202 such as one or more displays, speakers, printers, and/or any other output device may also be included in device 192. Input device(s) 204 and output device(s) 202 may be connected to device 192 via a wired connection, wireless connection, or any combination thereof. In one embodiment, an input device or an output device from another computing device may be used as input device(s) 204 or output device(s) 202 for computing device 192.

Components of computing device 192 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 192 may be interconnected by a network. For example, memory 198 may be comprised of multiple physical memory units located in different physical locations interconnected by a network.

Those skilled in the art will realize that storage devices utilized to store computer readable instructions may be distributed across a network. For example, a computing device 210 accessible via network 208 may store computer readable instructions to implement one or more embodiments provided herein. Computing device 192 may access computing device 210 and download a part or all of the computer readable instructions for execution. Alternatively, computing device 192 may download pieces of the computer readable instructions, as needed, or some instructions may be executed at computing device 192 and some at computing device 210.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method of presenting, on a computing device to a user, content items shared with the user within a social network by other users of the social network and hosted by a website external to the social network, the method comprising:

retrieving, from the social network, database records indicating a list of the content items that are shared with the user by other users of the social network and hosted by multiple websites external to a website of the social network;

storing, at the computing device, the retrieved database records indicating the list of the content items that are shared with the user by other users of the social network and hosted by the multiple websites external to the website of the social network, the database records individually identifying one or more of the content items and one of the multiple websites hosting the one or more of the content items; and upon receiving, at the computing device, a request from the user for a presentation of one of the websites external to the website of the social network in a web browser, retrieving, from the one of the websites external to the website of the social network, one or more web components of the one of the websites external to the website of the social network;

identifying, from the database records stored at the computing device, one or more content items that are (i) a subset of the list of content items in the database records stored at the computing device, (ii) hosted by the one of the websites external to the website of the social network, and (iii) shared with the user by the other users within the social network based on an identity of the one of the websites external to the website of the social network; and outputting, in the web browser on the computing device, a webpage of the one of the websites external to the website of the social network and requested by the user, the webpage of the one of the websites external to the website of the social network including both the retrieved web components of the requested one of the websites and the identified one or more content items hosted by the requested one of the websites external to the website of the social network and shared with the user by the other users within the social network.

2. The method of claim 1, further comprising, upon receiving from the social network an update to a content item in the identified one or more content items while presenting to the user the one of the websites hosting the content item, sending the update to the user for inclusion in the presentation.

3. The method of claim 1, further comprising discarding content items older than a content item duration from the identified one or more content items.

4. The method of claim 1 wherein:

at least one content item is associated with a comment; and retrieving the list of content items includes:

polling the social network to retrieve the list of content items at a first frequency; and polling the social network to retrieve the comment associated with the at least one content item at a second frequency that is higher than the first frequency.

5. A computing device, comprising:

a processor; and a memory operatively coupled to the processor, the memory containing instructions executable by the processor to cause the computing device to:

retrieve, from a social network, database records indicating a list of content items that are shared with the user by other users of the social network and hosted by multiple websites external to the social network;
store, at the computing device, the retrieved database records indicating the list of the content items that are shared with the user by other users of the social network and hosted by the multiple websites external to the web site of the social network, the database records individually identifying one or more of the content items and one of the websites external to the social network and hosting the one or more of the content items; and
upon receiving, at the computing device from the user, a request for a presentation of one of the websites external to a website of the social network:
retrieve, from the one of the websites external to the web site of the social network, one or more web components of the one of the websites external to the web site of the social network;
identify, from the database records stored at the computing device, one or more content items that are a subset of the content items in the list of the retrieved database records, hosted by one of the websites, and shared with the user by the other users within the social network based on an identity of the one of the one of the websites; and
output, on the computing device, a webpage of the one of the websites external to the website of the social network requested by the user, the webpage including both the retrieved web components of the requested one of the websites and the identified one or more content items that are a subset of the content items in the list of content items, the subset of the content items being hosted by the one of the websites external to the website of the social network and shared with the user by the other users within the social network.

6. The computing device of claim 5 wherein the memory contains additional instructions executable by the processor to, receive from the social network an update to a content item in the identified one or more content items and send the update to the user for inclusion in the presentation.

7. The computing device of claim 5 wherein the memory contains additional instructions executable by the processor to discard one or more content items older than a threshold duration from the identified one or more content items.

8. The computing device of claim 5 wherein:
at least one content item is associated with a comment; and
to retrieve the list of content items includes:
poll the social network to retrieve the list of content items at a first frequency; and
poll the social network to retrieve the comment associated with the at least one content item at a second frequency that is higher than the first frequency.

9. The computing device of claim 5 wherein:
the request for a presentation comprising a request to render the content source in a web browser; and
the memory contains additional instructions executable by the processor to integrate, into the content source rendered in the web browser, the one or more content items hosted by the one of the websites and shared with the user by the other users within the social network.

10. The computing device of claim 5 wherein:
the request for a presentation comprising a request to render the content source in a web browser; and
the memory contains additional instructions executable by the processor to integrate, into the one of the websites rendered in the web browser, the one or more content items hosted by the content source and shared with the user by the other users within the social network, as preview versions of the one or more content items.

11. The computing device of claim 5 wherein:
the request for a presentation comprising a request to render the one of the websites in a web browser; and
the memory contains additional instructions executable by the processor to:
integrate, into the one of the websites rendered in the web browser, the one or more content items hosted by the one of the websites and shared with the user by the other users within the social network, as preview versions of the one or more content items; and
upon receiving a user selection of one of the preview versions of the one or more content items,
request the selected content item from the one of the websites, and
present the content item requested from the one of the websites to the user in the presentation of the one of the websites.

12. A method of presenting, on a computing device to a user, content items shared with the user within a social network by other users of the social network and hosted by a website external to the social network, the computing device having multiple database records individually identifying one or more content items that are shared with the user by the other users of the social network and hosted by multiple corresponding websites external to the social network, wherein the method comprising:
receiving, at the computing device and from a user, a request for a presentation of a webpage of the website external to the social network in a web browser on the computing device; and
in response to receiving the request for the presentation of the webpage of the website external to the social network,
retrieving, from the web site, one or more web components of the web site external to the social network;
identifying, based on an identity of the website, a subset of the multiple database records at the computing device, the subset of the multiple database records individually identifying one or more of content items hosted by the website and shared with the user by the other users within the social network; and
outputting, in the web browser on the computing device, a presentation of the webpage of the requested web site external to the social network, the webpage including both the retrieved web components of the website external to the social network and the one or more content items corresponding to the identified subset of the multiple database records, the one or more content items being hosted by the website external to the social network and shared with the user by the other users within the social network.

13. The method of claim 12, further comprising receiving from the social network an update to a content item in the identified one or more content items and sending the update to the user for inclusion in the presentation.

14. The method of claim 12, further comprising discarding one or more content items shared with the user and hosted by the website but older than a threshold duration from the identified one or more content items.

15. The method of claim 12 wherein:

at least one content item in the identified one or more content items is associated with a comment; and the method further includes polling the social network to retrieve the comment associated with the at least one content item; and presenting the retrieved comment on the webpage of the presentation of the website external to the social network.

16. The method of claim 12 wherein:

the request for a presentation comprising a request to render the webpage of the website in the web browser; and the memory contains additional instructions executable by the processor to integrate, into the webpage of the website rendered in the web browser, the one or more content items corresponding to the identified subset of the multiple database records and hosted by the web site and shared with the user by the other users within the social network.

17. The method of claim 12 wherein:

the request for a presentation comprising a request to render the website in the web browser; and the method further includes integrating, into the presentation of the website rendered in the web browser, the identified one or more content items corresponding to the identified subset of the multiple database records and hosted by the website and shared with the user by the other users within the social network, as preview versions of the one or more content items.

18. The method of claim 12 wherein:

the request for a presentation comprising a request to render the website in the web browser; and the method further includes:

integrating, into the presentation of the web site rendered in the web browser, the identified one or more content items corresponding to the identified subset of the multiple database records and hosted by the website and shared with the user by the other users within the social network, as preview versions of the one or more content items; and upon receiving a user selection of one of the preview versions of the one or more content items, retrieving the selected content item from the website, and presenting the content item requested from the web site to the user in the presentation of the website.

19. The method of claim 12, further comprising:

receiving, from the user, a comment on one of the identified one or more content items included in the presentation of the website external to the social network; and transmitting, from the computing device, the received comment to the social network.

20. The method of claim 12 wherein:

the social network is a first social network; and identifying the one or more of content items includes identifying, based on the database records at the computing device, the one or more of content items hosted by the website and shared with the user by the other users within both the first social network and a second social network different than the first social network.

* * * * *